US012641566B2

(12) United States Patent
Wang et al.

(10) Patent No.: US 12,641,566 B2
(45) Date of Patent: May 26, 2026

(54) POSITIONING METHOD AND APPARATUS, AND COMMUNICATION DEVICE

(71) Applicant: VIVO MOBILE COMMUNICATION CO., LTD., Guangdong (CN)

(72) Inventors: Yuanyuan Wang, Guangdong (CN); Ye Si, Guangdong (CN); Huaming Wu, Guangdong (CN); Zixun Zhuang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 287 days.

(21) Appl. No.: 18/467,931

(22) Filed: Sep. 15, 2023

(65) Prior Publication Data

US 2024/0007991 A1     Jan. 4, 2024

Related U.S. Application Data

(63) Continuation of application No. PCT/CN2022/080911, filed on Mar. 15, 2022.

(30) Foreign Application Priority Data

Mar. 17, 2021     (CN) ........................ 202110287923.X

(51) Int. Cl.
H04W 64/00 (2009.01)
H04L 5/00 (2006.01)

(52) U.S. Cl.
CPC ........... H04W 64/00 (2013.01); H04L 5/0051 (2013.01)

(58) Field of Classification Search
CPC ..... H04W 64/00; H04W 64/006; H04W 4/02; H04L 5/0051; H04L 5/0023;
(Continued)

(56) References Cited

U.S. PATENT DOCUMENTS 9,549,288 B2 * 1/2017 Werner .................... G01S 5/10
2020/0092737 A1 3/2020 Siomina et al.
(Continued)

FOREIGN PATENT DOCUMENTS

WO     2020060118 A1     3/2020
WO     2020191646 A1     10/2020
(Continued)

OTHER PUBLICATIONS

Qualcomm Incorporated, "DL and UL NR Positioning Procedures", R2-1909416, 3GPP TSG-RAN WG2 Meeting #107, Aug. 26-30, 2019, Prague, CZ.

*Primary Examiner* — Kabir A Timory
(74) *Attorney, Agent, or Firm* — Price Heneveld LLP

(57)     ABSTRACT

This application discloses a positioning method and apparatus, and a communication device. The positioning method is performed by a first device, and the method comprises: performing measurement on a positioning reference signal PRS; and reporting location information and time information to a second device, where the reported location information corresponds to first-type location information, and the first-type location information comprises at least one of the following: location information associated with a first period of a positioning reference signal set instance (PRS set instance); location information associated with a measurement occasion (MO); location information associated with a measurement report (MR); or location information associated with a measurement time window.

20 Claims, 7 Drawing Sheets

(58) Field of Classification Search
CPC ... H04L 5/0082; H04L 5/0048; H04L 5/0069;
H04L 5/0091; H04L 27/261; G01S
2205/008; G01S 5/0009
See application file for complete search history.

(56) References Cited

U.S. PATENT DOCUMENTS

| | | | | |
|---|---|---|---|---|
| 2020/0145977 | A1* | 5/2020 | Kumar | G01S 5/0063 |
| 2020/0351047 | A1 | 11/2020 | Akkarakaran et al. | |
| 2020/0367193 | A1 | 11/2020 | Cha et al. | |
| 2023/0328567 | A1* | 10/2023 | Manolakos | H04W 24/10 |
| | | | | 370/252 |

FOREIGN PATENT DOCUMENTS

| | | | |
|---|---|---|---|
| WO | 2021006803 | A1 | 1/2021 |
| WO | 2021023912 | A1 | 2/2021 |
| WO | 2021030628 | A1 | 2/2021 |

* cited by examiner

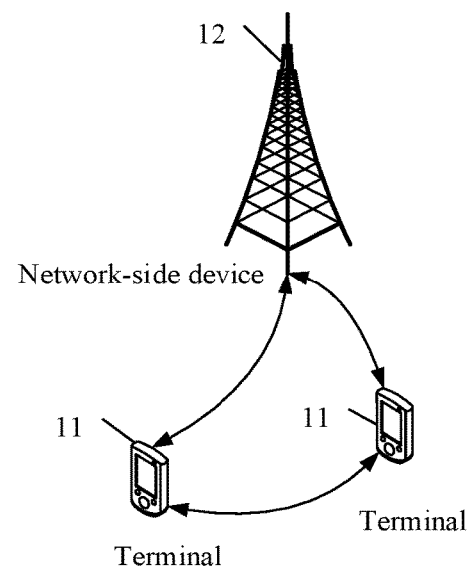

Network-side device

11

11

Terminal

Terminal

FIG. 1

```
┌──────────────────────────┐
│      ┌──────────┐        │
│      │  ┌────┐  │        │              ┌────────┐      ┌ ─ ─ ─ ─ ┐
│      │  │ TP │  │        │              │        │       E-SMLC
│      │  └────┘  │        │              │  LMF   │──────
│      │  ng-eNB  │        │              │        │      └ ─ ─ ─ ─ ┘
│      │  ┌────┐  │        │  NG-C        └────────┘
│LTE-Uu│  │ TP │  │        │                  │
│      │  └────┘  │        │                 NL1         ┌ ─ ─ ─ ─ ┐
│      └──────────┘        │                  │
│           │ Xn           │                  │             SLP
│      ┌──────────┐        │              ┌────────┐
│ ┌────│  ┌────┐  │        │   NG-C       │        │      └ ─ ─ ─ ─ ┘
│ │    │  │TRP │  │        │──────────────│  AMF   │
│ │    │  └────┘  │        │              │        │
│ │    │   gNB    │        │              └────────┘
│ │    │  ┌────┐  │        │
│ │    │  │TRP │  │        │
│ │    │  └────┘  │        │
│ │    └──────────┘        │
│ │         NG-RAN         │
└─┼────────────────────────┘
  │
┌──────────┐
│   UE     │
│NR-Uu     │
│ ┌────┐   │
│ │SET │   │
│ └────┘   │
└──────────┘
```

FIG. 2

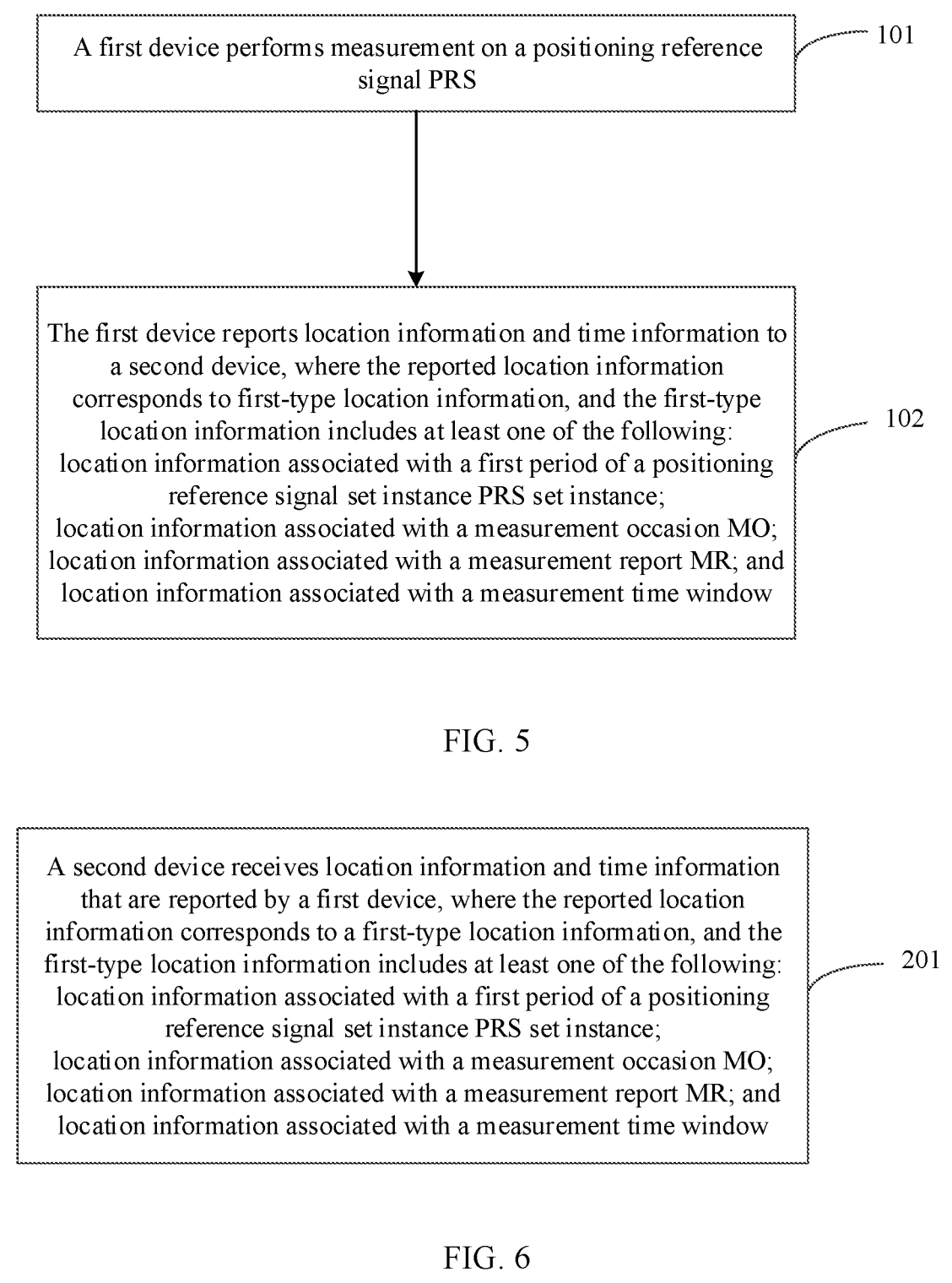

A first device performs measurement on a positioning reference signal PRS — 101

The first device reports location information and time information to a second device, where the reported location information corresponds to first-type location information, and the first-type location information includes at least one of the following:
location information associated with a first period of a positioning reference signal set instance PRS set instance;
location information associated with a measurement occasion MO;
location information associated with a measurement report MR; and
location information associated with a measurement time window — 102

FIG. 5

A second device receives location information and time information that are reported by a first device, where the reported location information corresponds to a first-type location information, and the first-type location information includes at least one of the following:
location information associated with a first period of a positioning reference signal set instance PRS set instance;
location information associated with a measurement occasion MO;
location information associated with a measurement report MR; and
location information associated with a measurement time window — 201

FIG. 6

POSITIONING METHOD AND APPARATUS, AND COMMUNICATION DEVICE

CROSS-REFERENCE TO RELATED APPLICATIONS

The present application is a continuation application of International Application No. PCT/CN2022/080911, filed on Mar. 15, 2022. International Application No. PCT/CN2022/080911 claims priority to Chinese Patent Application No. 202110287923.X, filed in China on Mar. 17, 2021. Each of the above-listed applications is incorporated herein by reference in its entirety.

TECHNICAL FIELD

This application relates to the field of communications technologies, and in particular, to a positioning method and apparatus and a communication device.

BACKGROUND

In a positioning process, synchronization errors, device group delays, and angle errors are present between network-side devices and terminal devices, and these errors vary over time. In addition, location information of terminals changes over time. Reporting of location information is currently made by terminals at intervals of greater than s, and it is unclear whether reported measurements includes a single measurement. A correspondence between the reported measurements and time stamps is also unclear.

SUMMARY

According to a first aspect, an embodiment of this application provides a positioning method, applied to a first device. The method includes:

performing, by a first device, measurement on a positioning reference signal (PRS); and reporting, by the first device, location information and time information to a second device, where the reported location information corresponds to first-type location information, and the first-type location information includes at least one of the following:

location information associated with a first period of a positioning reference signal set instance (PRS set instance);

location information associated with a measurement occasion (MO);

location information associated with a measurement report (MR); or location information associated with a measurement time window.

According to a second aspect, an embodiment of this application provides a positioning method, applied to a second device. The method includes:

receiving, by the second device, location information and time information that are reported by a first device, where the reported location information corresponds to first-type location information, and the first-type location information includes at least one of the following:

location information associated with a first period of a positioning reference signal set instance (PRS set instance);

location information associated with a measurement occasion (MO);

location information associated with a measurement report (MR); or location information associated with a measurement time window.

According to a third aspect, an embodiment of this application provides a positioning apparatus, applied to a first device. The apparatus includes:

a measurement module, configured to perform measurement on a positioning reference signal PRS; and a reporting module, configured to report location information and time information to a second device, where the reported location information corresponds to first-type location information, and the first-type location information includes at least one of the following:

location information associated with a first period of a positioning reference signal set instance (PRS set instance);

location information associated with a measurement occasion (MO);

location information associated with a measurement report (MR); or location information associated with a measurement time window.

According to a fourth aspect, an embodiment of this application provides a positioning apparatus, applied to a second device. The apparatus includes:

a receiving module, configured to receive location information and time information that are reported by a first device, where the reported location information corresponds to first-type location information, and the first-type location information includes at least one of the following:

location information associated with a first period of a positioning reference signal set instance (PRS set instance);

location information associated with a measurement occasion (MO);

location information associated with a measurement report (MR); or location information associated with a measurement time window.

According to a fifth aspect, a communication device is provided, where the communication device includes a processor, a memory, and a program or instructions stored in the memory and capable of running on the processor, and when the program or the instructions are executed by the processor, the steps of the method according to the first aspect or the second aspect are implemented.

According to a sixth aspect, a terminal is provided, including a processor and a communication interface, where the processor is configured to perform measurement on a positioning reference signal (PRS), and the communication interface is configured to report location information and time information to a second device, where the reported location information corresponds to first-type location information, and the first-type location information includes at least one of the following:

location information associated with a first period of a positioning reference signal set instance (PRS set instance);

location information associated with a measurement occasion (MO);

location information associated with a measurement report (MR); or location information associated with a measurement time window.

According to a seventh aspect, a network-side device is provided, including a processor and a communication interface, where the communication interface is configured to receive location information and time information that are reported by a first device, where the reported location information corresponds to first-type location information, and the first-type location information includes at least one of the following:

location information associated with a first period of a positioning reference signal set instance (PRS set instance);

location information associated with a measurement occasion (MO);

location information associated with a measurement report (MR); or location information associated with a measurement time window.

According to an eighth aspect, a readable storage medium is provided, where a program or instructions are stored in the readable storage medium, and when the program or the instructions are executed by a processor, the steps of the method according to the first aspect are implemented, or the steps of the method according to the second aspect are implemented.

According to a ninth aspect, a chip is provided, where the chip includes a processor and a communication interface, the communication interface is coupled to the processor, and the processor is configured to run a program or instructions to implement the method according to the first aspect or the method according to the second aspect.

According to a tenth aspect, a computer program product/program product is provided, where the computer program/program product is stored in a non-transitory storage medium, and the program/program product is executed by at least one processor to implement the method according to the first aspect or the second aspect.

According to an eleventh aspect, a communication device is provided, configured to perform the steps of the method described according to the first aspect or the second aspect.

In the embodiments of this application, after performing measurement on the PRS, the first device reports the location information and time information to the second device, where the reported location information corresponds to the first-type location information, and the first-type location information includes at least one of the following: location information associated with a first period of a positioning reference signal set instance (PRS set instance); location information associated with a measurement occasion (MO); location information associated with a measurement report (MR); or location information associated with a measurement time window. In the embodiments, it is clarified that time information is also reported when location information is reported, thereby improving positioning accuracy.

BRIEF DESCRIPTION OF DRAWINGS

FIG. 1 is a schematic diagram of a wireless communications system;

FIG. 2 is a schematic structural diagram of a positioning device;

FIG. 5 is a schematic flowchart of a positioning method performed by a first device according to an embodiment of this application;

FIG. 6 is a schematic flowchart of a positioning method performed by a second device according to an embodiment of this application;

DESCRIPTION OF EMBODIMENTS

Figure 3:
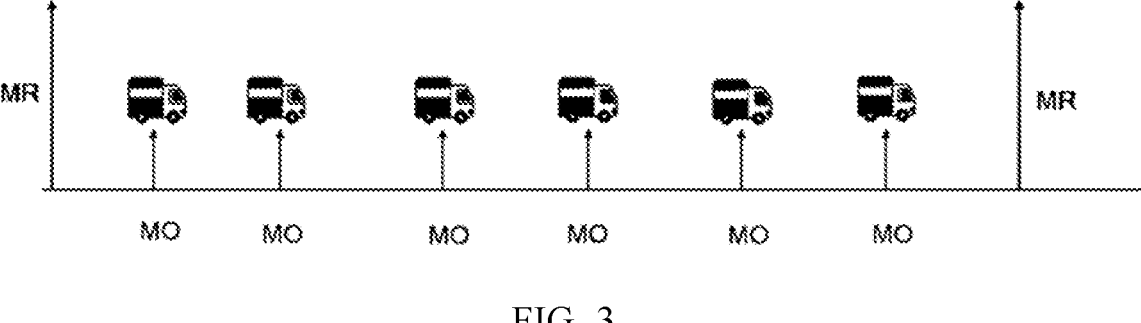
FIG. 3 is a schematic diagram of MR and MO.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments in this application fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, in the specification and claims, "and/or" represents presence of at least one of connected objects, and the symbol "/" in this specification usually indicates an "or" relationship between associated objects.

It should be noted that techniques described in the embodiments of this application are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (New Radio, NR) system is described for an illustration purpose, and NR terms are used in most of the following descriptions, although these technologies may also be applied to other applications than an NR system application, for example, the 6th generation (6G) communications system.

FIG. 1 is a schematic diagram of a wireless communications system to which the embodiments of this application are applicable. The wireless communications system includes a terminal 11 and a network-side device 12. The terminal 11 may also be referred to as a terminal device or user equipment (UE), and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a smart watch, a wrist band, earphones, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited. The core network device may be a location management device, for example, a location management function (LMF, E-SLMC).

The following describes in detail a positioning method provided in the embodiments of this application by using some embodiments and application scenarios thereof with reference to the accompanying drawings.

Current NR positioning devices, as shown in FIG. 2, include terminal (UE), base station (Transmission and reception point (TRP)), and location management function (LMF), where TP is a transmission point, AMF is an access and mobility management function, E-SMLC is an enhanced service mobile location center, SLP is a service location protocol, and the UE communicates with the base station over a Uu interface. Current positioning methods mainly include terminal-based (UE-based) positioning, LMF-based terminal-assisted (UE-assisted) positioning, and 5G radio access network node-assisted (NG-RAN node assisted) positioning. It should be noted that the positioning device is only an example of one embodiment, and if the device is a related evolution, it still falls within the protection scope of this application.

The current positioning methods are shown in the table below:

| Method | UE-based | UE-assisted, LMF-based | NG-RAN node assisted | SUPL |
|---|---|---|---|---|
| Assisted-global navigation satellite system (A-GNSS) | Yes (Yes) | Yes | No | Yes (UE-based and UE-assisted) |
| Observed time difference of arrival (OTDOA) Note 1, Note 2 | No (No) | Yes | No | Yes (UE-assisted) |
| Enhanced cell identifier (E-CID) positioning Note 4 | No | Yes | Yes | Yes for E-UTRA (UE-assisted) |
| Sensor (Sensor) | Yes | Yes | No | No |
| Wireless local area network (WLAN) | Yes | Yes | No | Yes |
| Bluetooth | No | Yes | No | No |
| Terrestrial beacon | Yes | Yes | No | Yes (MBS) |

-continued

| Method | UE-based | UE-assisted, LMF-based | NG-RAN node assisted | SUPL |
|---|---|---|---|---|
| system (TBS) Note 5 | | | | |
| Downlink time difference of arrival (DL-TDOA) | Yes | Yes | No | No |
| Downlink angle of departure (DL-AoD) | Yes | Yes | No | No |
| Multi round-trip time (Multi-RTT) | No | Yes | Yes | No |
| New radio (NR) E-CID | No | Yes | FFS | No |
| Uplink time difference of arrival (UL-TDOA) | No | No | Yes | No |
| Uplink angle of arrival (UL-AoA) | No | No | Yes | No |

Note 1:
This includes TBS positioning based on PRS signals (This includes TBS positioning based on PRS signals).
Note 2:
In this version of the specification only OTDOA based on LTE signals is supported.
Note 3:
Void.
Note 4:
This includes Cell-ID for NR method.
Note 5:
In this version of the specification only for TBS positioning based on MBS signals.
Note 6:
Void.

An embodiment of this application provides a positioning method, and as shown in FIG. 5, the method includes the following steps.

Step 101: A first device performs measurement on a positioning reference signal (PRS).

Step 102: The first device reports location information and time information to a second device, where the reported location information corresponds to first-type location information, and the first-type location information includes at least one of the following:

location information associated with a first period of a positioning reference signal set instance (PRS set instance);

location information associated with a measurement occasion;

location information associated with a measurement report; or location information associated with a measurement time window.

In this embodiment of this application, after performing measurement on the PRS, the first device reports the location information and time information to the second device, where the reported location information corresponds to the first-type location information, and the first-type location information includes at least one of the following: location information associated with a first period of a positioning reference signal set instance PRS set instance; location information associated with a measurement occasion MO; location information associated with a measurement report MR; or location information associated with a measurement time window. In this embodiment, it is clarified that time information is also reported when location information is reported, thereby improving positioning accuracy.

In an embodiment shown in FIG. 3, a measurement report (MR) indicates one reporting (where one reporting may include results for multiple MOs or results for multiple measurement instances), and a minimum reporting period ranges from 1 s to 10 ms.

For measurement occasion (MO):

Downlink may alternatively be understood as measurement instances corresponding to a downlink positioning method, including measurements of RSTD, DL RSRP, UE Rx-Tx time difference, and so on, where RSTD is a reference signal time difference, DL RSRP is a downlink reference signal received power, and UE Rx-Tx time difference is a terminal receive-transmit time difference.

Uplink may alternatively be understood as measurement instances corresponding to an uplink positioning method, including measurements of relative time of arrival (RTOA), UL RSRP, gNB Rx-Tx time difference, and so on, where UL RSRP is an uplink reference signal received power, and gNB Rx-Tx time difference is a base station receive-transmit time difference.

For downlink: each measurement instance is equivalent to N instances of DL-PRS Resource Set (N instances of downlink positioning reference signal set) and may be understood as N*period of DL-PRS resource set.

For uplink: each measurement instance is equivalent to M SRS measurement time occasions (M sounding reference signal measurement time occasions) and may be understood as M*period of SRS.

Figure 4:
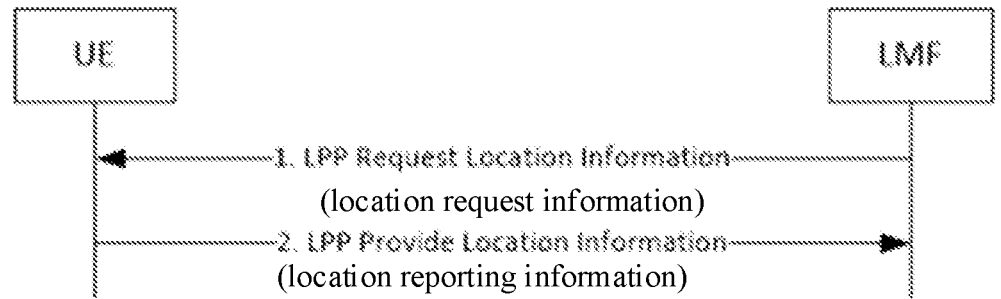
FIG. 4 is a schematic diagram of requesting for location information and reporting location information.

As shown in FIG. 4, during positioning, the LMF sends location request information (LPP Request Location Information) to the UE, and the UE sends location reporting information (LPP Provide Location Information) to the LMF.

In this embodiment, the location reporting information sent by the UE to the LMF may include the following information:

| Information | UE-assisted | UE-based |
|---|---|---|
| Latitude/longitude/altitude, together with uncertainty shape | No (Yes) | Yes |
| PCI, GCI, and TRP ID for each measurement | Yes | No |
| Downlink RSTD measurement (DL RSTD measurement) | Yes | No |
| Downlink PRS-RSRP measurement (DL-PRS-RSRP measurement) | Yes | No |
| Time stamp of the measurements (measurement instance, measurement occasion) | Yes | No |
| Time stamp of location estimate | No | Yea |
| Quality for each measurement | Yes | No |
| Type of measurement and reporting (per MO, Per instance) | | |

PCI (Physical Cell Identifier) is a physical cell identifier; GCI (Global Cell Identifier) is a global cell identifier; and TRP (Transmit Receive Point) is a transmission and reception point.

Time stamp of the measurements and type of measurement and reporting are content added in the location reporting information in this embodiment of this application.

According to different positioning methods, measurements to be reported are different and may be RSTD, RSRP, Rx-Tx time difference, or the like.

Using DL-TDOA as an example, the main measurement is RSTD (reference signal time difference);

using DL-AOD as an example, the main measurement is RSRP (Reference Signal Received Power); and

using Multi-RTT as an example, the main measurement is Rx-Tx time difference (receive-transmit time difference).

In some embodiments,

N1 pieces of location information are reported for one MO; or at least one piece of location information is reported for a period T of M1 PRS set instances or a first period, for example, one piece of location information, M1 pieces of location information, M1+1 pieces of location information, and common divisor of M1 pieces of location information, or the like, at intervals of one period T, multiple periods T, or first periods; or N2 pieces of location information are reported for one MR period; or at least one piece of location information is reported for M2 MOs, for example, one piece of location information, M2 pieces of location information, M2+1 pieces of location information, common divisor of M2 pieces of location information, M2*M1 pieces of location information, or common divisor of M2*M1 pieces of location information are reported; or K1 pieces of location information are reported for one measurement time window; or at least one piece of location information is reported for K2 measurement time windows; where N1, M1, N2, M2, K1, and K2 are positive integers, M2 may be equal to M1 or equal to M1+1, and values of M1 and M2 may be 1 or other positive integers.

In some embodiments, the first period is greater than or equal to N times the period T of the positioning reference signal, where N is a positive integer and N depends on at least one of the following information:

carrier specific scaling factor CSSF $CSSF_{PRS,i}$;

number of receive beams $N_{RxBeam,i}$;

period of measurement gap;

period of positioning reference signal;

processing capability of the first device;

PRS processing capability of the first device;

muting configuration of PRS; or first indication information, where the first indication information indicates that N is 1 or a default value or an integer greater than 1.

In some embodiments, the first period is:

$$\text{First period} = \left( CSSF_{PRS,i} * N_{RxBeam,i} * \left\lceil \frac{N_{PRS,i}^{slot}}{N'} \right\rceil \left\lceil \frac{L_{PRS,i}}{N} \right\rceil * N_{sample} - 1 \right) * T_{effect,i} + T_{last};$$

$$\text{where, } T_{effect,i} = \left\lceil \frac{T_i}{T_{available\_PRS,i}} \right\rceil * T_{available PRS,i} \text{ or}$$

$$T_{effect,i} = \left\lceil \frac{T_i}{T_{PRS}} \right\rceil * T_{PRS}, \text{ or } T_{effect,i} = T_{PRS,i};$$

where i is a frequency layer, $T_{PRS}$ is a period T of positioning reference signal, $T_{available_{PRS,i}}$ is the least common multiple of periods of PRSs and measurement gaps, $T_i$ is a period T, and N PRSs are measured in time T, $T_{last} = T_i + L_{PRS,i}$, and $L_{PRS,i}$ is the number of PRSs in the time T. $N_{sample}$ is a correspondence between M1 or M2 pieces of location information and the number of PRS set instances/ MOs. For example, one piece of location information is reported per four PRS set instances, and $N_{sample}$ is 4. For another example, one piece of location information is reported per four MOs, and each MO corresponds to four PRS set instances, and $N_{sample}$ is 16.

N is a reference signal processing capability of the UE within time T, for example, a PRS processing capability.

$$N_{PRS,i}^{slot}$$

is the number of PRSs in each slot, and N' is a PRS processing capability in each slot.

In some embodiments, the reported location information includes first information, and the first information includes at least one first information element, and the first information element includes at least one of the following:

reference signal received power (RSRP) measurement information;

reference signal time difference (RSTD) measurement information;

receive-transmit time difference (Rx-Tx time difference) measurement information;

time of arrival (TOA) measurement information;

time difference of arrival (TDOA) information;

downlink angle of departure (AoD) measurement information;

multi-round trip time (Multi-RTT) information;

observed time difference of arrival (OTDOA) measurement information;

assisted-global navigation satellite system (A-gnss) information;

sensor information;

enhanced cell identifier (ECID) positioning information;

absolute location information;

relative location information;

reference location information;

positioning reference signal identification information;

time identification information;

angle measurement information;

transmission and reception point identifier (TRP ID) information;

time information;

additional measurement information (Additional measurement); or additional path list (AdditionalPathList).

In some embodiments, the first information further includes at least one of the following:

second-type information, indicating a relationship between the first information element and PRS set instance, MO, MR, or measurement time window;

second indication information, indicating a relationship between the first information element and the number of PRS set instances, MOs, MRs, or measurement time windows; or first time information, where the first time information is time information with a unit lower than second, for example, the unit is ms, or the first period may be used as a unit, a period T as a unit, a slot as a unit, or a system frame SFN as a unit.

In some embodiments, the second-type information includes enumeration information {PRS set instance, MO, MR, measurement time window}, and the second-type information is any one of the enumeration information, indicating that the first information element corresponds to the enumeration information.

In some other embodiments, the second indication information is a quantity S, and a value of S is 0, 1, 2, 4, or the like. It should be noted that the value of S is only an example and any other different values should also fall within the protection scope of this application. If S is 4, it may indicate that the first unit information is associated with four pieces of second-type information; or may indicate that the first information element includes four pieces of information associated with the second-type information.

In some embodiments, in a case of being a first information element obtained for more than one PRS set instance, the first information element includes any one of the following:

first-item information: the first information element being first information element information obtained by filtering measurement information for more than one PRS set instance or measurement time window; and second-item information: the first information element being first information element information in one-to-one correspondence to measurement information for PRS set instances or measurement time windows.

It should be noted that the first-item information may be understood as that information corresponding to the first information element is a result obtained through filtering and fitting after measurements for multiple PRS periods.

The second-item information may be understood as that location information obtained without filtering and fitting in one PRS period is present in the location information.

In some embodiments, the method further includes:

reporting, by the first device, third indication information, indicating that the first information element includes the first-item information and/or the second-item information, so that the second device can learn about content included in the first information element.

In some embodiments, the first information includes one, X1, or X2 first information elements, X1 and X2 being positive integers greater than 1, and the first information includes at least one of the following:

X1 first information elements obtained through measurement for X1 PRS set instances or measurement time windows;

X1 first information elements obtained through measurement for X1 PRS set instances or measurement time windows closest to a reporting time;

X1 first information elements obtained through measurement for X1 PRS set instances or measurement time windows before a preset reference time;

X1 first information elements obtained through measurement for X1 PRS set instances or measurement time windows within a preset time window;

X2 first information elements obtained through measurement for X2 MOs; X2 first information elements obtained through measurement for X2 MOs closest to the reporting time;

X2 first information elements obtained through measurement for X2 MOs before the preset reference time; or X2 first information elements obtained through measurement for X2 MOs within the preset time window.

In this embodiment, the reported location information (ProvideLocationInformation-r9-IEs) may include:

commonIEsProvideLocationInformation (first location information);

a-gnss-ProvideLocationInformation (first positioning location information);

otdoa-ProvideLocationInformation (first positioning location information);

sensor-ProvideLocationInformation-r13 (first positioning location information);

ecid-ProvideLocationInformation (first signal measurement information);

nr-Multi-RTT-ProvideLocationInformation (first positioning location information);

nr-DL-AoD-ProvideLocationInformation (first positioning location information); and nr-DL-TDOA-ProvideLocationInformation (first positioning location information).

In some embodiments, nr-Multi-RTT-ProvideLocationInformation includes: NR-Multi-RTT-SignalMeasurementInformation (first signal measurement information), NR-Multi-RTT-SignalMeasurementInformation includes: NR-Multi-RTT-MeasList (first signal measurement list), and NR-Multi-RTT-MeasList includes nr-Multi-RTT-r16 (first signal measurement value).

In some embodiments, nr-DL-AoD-ProvideLocationInformation includes NR-DL-AoD-SignalMeasurementInformation (first positioning location information), NR-DL-AoD-SignalMeasurementInformation includes NR-DL-AoD-MeasList (first signal measurement list), NR-DL-AoD-MeasList includes NR-DL-AoD-Meas Element (first signal measurement unit), and NR-DL-AoD-Meas Element includes nr-RSRP-r16 (first signal measurement value).

In some embodiments, nr-DL-TDOA-ProvideLocationInformation includes NR-DL-TDOA-SignalMeasurementInformation (first signal measurement information), NR-DL-TDOA-SignalMeasurementInformation includes NR-DL-TDOA-MeasList (first signal measurement list), NR-DL-TDOA-MeasList includes NR-DL-TDOA-Meas Element (first signal measurement unit), and NR-DL-TDOA-Meas Element includes nr-RSTD-r16 (first signal measurement value).

In some embodiments, the first information is first location information, and the first information element is a first location information element; or the first information is first positioning location information, and the first information element is first signal measurement information; or the first information is first signal measurement information, and the first information element is a first signal measurement list; or the first information is a first signal measurement list, and the first information element is a first signal measurement unit; or the first information is a first signal measurement unit, and the first information element is a first signal measurement value.

In a specific example, the reported location information includes at least one of first location information and first positioning location information, and the first positioning location information includes at least one of the following:

TDOA information;

AoD measurement error information;

multi-RTT information;

OTDOA measurement information;

A-gnss information;

sensor information; or

ECID information.

The first location information includes at least one first location information element, and the first location information element includes at least one of the following:

absolute location information (such as latitude and longitude information);

relative location information; or reference location information.

The first location information includes one, X1, or X2 first location information elements, where X1 and X2 are positive integers, and the first location information includes at least one of the following:

X1 pieces of first location unit information obtained through measurement for X1 instances (instance);

X1 pieces of first location unit information obtained through measurement for X1 instances closest to a reporting time;

X1 pieces of first location unit information obtained through measurement for X1 instances before a preset reference time;

X1 pieces of first location unit information obtained through measurement for X1 instances within a preset time window;

X2 pieces of first location unit information obtained through measurement for X2 occasions (occasion);

X2 pieces of first location unit information obtained through measurement for X2 occasions closest to the reporting time;

X2 pieces of first location unit information obtained through measurement for X2 occasions before the preset reference time; or X2 pieces of first location unit information obtained through measurement for X2 occasions within the preset time window.

In another specific example, the first positioning location information includes at least one piece of first signal measurement information. The first positioning location information includes at least one of the following:

X1 pieces of first signal measurement information obtained through measurement for X1 instances;

X1 pieces of first signal measurement information obtained through measurement for X1 instances closest to a reporting time;

X1 pieces of first signal measurement information obtained through measurement for X1 instances before a preset reference time;

X1 pieces of first signal measurement information obtained through measurement for X1 instances within a preset time window;

X2 pieces of first signal measurement information obtained through measurement for X2 occasions (occasion);

X2 pieces of first signal measurement information obtained through measurement for X2 occasions closest to the reporting time;

X2 pieces of first signal measurement information obtained through measurement for X2 occasions before the preset reference time; or X2 pieces of first signal measurement information obtained through measurement for X2 occasions within the preset time window; where X1 and X2 are positive integers.

In some embodiments, the first signal measurement information includes one, X1, or X2 first signal measurement lists, X1 and X2 being positive integers, each of the first signal measurement lists includes B first signal measurement units, B being an integer less than or equal to nrMaxTRP, and nrMaxTRP is an integer greater than 1. The first signal measurement unit includes at least one of the following:

reference signal received power RSRP measurement information;

reference signal time difference RSTD measurement information;

receive-transmit time difference Rx-Tx time difference measurement information;

time of arrival TOA measurement information;

positioning reference signal identification information;

time identification information;

angle measurement information;

transmission and reception point identifier TRP ID information;

time information;

additional measurement information Additional measurement; or additional path list AdditionalPathList.

In some embodiments, the first signal measurement information includes at least one of the following:

X1 pieces of first signal measurement list obtained through measurement for X1 instances;

X1 pieces of first signal measurement list obtained through measurement for X1 instances closest to a reporting time;

X1 pieces of first signal measurement list obtained through measurement for X1 instances before a preset reference time;

X1 pieces of first signal measurement list obtained through measurement for X1 instances within a preset time window;

X2 pieces of first signal measurement list obtained through measurement for X2 occasions;

X2 pieces of first signal measurement list obtained through measurement for X2 occasions closest to the reporting time;

X2 pieces of first signal measurement list obtained through measurement for X2 occasions before the preset reference time; or X2 pieces of first signal measurement list obtained through measurement for X2 occasions within the preset time window; where X1 and X2 are positive integers.

In some embodiments, the first signal measurement information includes one first signal measurement list and/or at least one of the following:

Y1-1 second signal measurement lists obtained through measurement for Y1-1 PRS set instances or measurement time windows;

Y1-1 second signal measurement lists obtained through measurement for Y1-1 PRS set instances or measurement time windows closest to a reporting time;

Y1-1 second signal measurement lists obtained through measurement for Y1-1 PRS set instances or measurement time windows before a preset reference time;

Y1-1 second signal measurement lists obtained through measurement for Y1-1 PRS set instances or measurement time windows within a preset time window;

Y2-1 second signal measurement lists obtained through measurement for Y2-1 MOs;

Y2-1 second signal measurement lists obtained through measurement for Y2-1 MOs closest to the reporting time;

Y2-1 second signal measurement lists obtained through measurement for Y2-1 MOs before the preset reference time; or Y2-1 second signal measurement lists obtained through measurement for Y2-1 MOs within the preset time window; where Y1 and Y2 are positive integers greater than 1.

The second signal measurement list includes at least one of the following:

RSRP measurement information;

RSTD measurement information;

Rx-Tx time difference measurement information;

TOA measurement information;

positioning reference signal identification information and/or time identification information;

angle measurement information;

TRP ID information;

positioning reference signal identification information;

time information;

additional measurement information (Additional measurement); or additional path list (AdditionalPathList).

In a case that corresponding information in the second signal measurement list is the same as that in the first signal measurement list, the TRP ID information and the positioning reference signal identification information are omitted.

In some embodiments, the first signal measurement list includes one first signal measurement unit and/or at least one of the following:

second signal measurement unit list;

Y1-1 second signal measurement units obtained through measurement for Y1-1 PRS set instances or measurement time windows;

Y1-1 second signal measurement units obtained through measurement for Y1-1 PRS set instances or measurement time windows closest to a reporting time;

Y1-1 second signal measurement units obtained through measurement for Y1-1 PRS set instances or measurement time windows before a preset reference time;

Y1-1 second signal measurement units obtained through measurement for Y1-1 PRS set instances or measurement time windows within a preset time window;

Y2-1 second signal measurement units obtained through measurement for Y2-1 MOs;

Y2-1 second signal measurement units obtained through measurement for Y2-1 MOs closest to the reporting time;

Y2-1 second signal measurement units obtained through measurement for Y2-1 MOs before the preset reference time; or Y2-1 second signal measurement units obtained through measurement for Y2-1 MOs within the preset time window; where Y1 and Y2 are positive integers greater than 1.

In some embodiments, the second signal measurement unit includes at least one of the following:

RSRP measurement information;

RSTD measurement information;

Rx-Tx time difference measurement information;

TOA measurement information;

angle measurement information;

time information;

Additional measurement; or

AdditionalPathList.

In some embodiments, before the performing measurement on a positioning reference signal PRS, the method further includes:

receiving, by the first device, a location information request from a third device, where the location information request includes at least one of the following indication information:

a location information request for more than one PRS set instance or measurement time window;

a location information request corresponding to a PRS set instance;

the number of PRS set instances, MOs, or measurement time windows corresponding to location information;

value of X1 or X2;

measurement time window information;

priority information; or reference time information.

The third device may be the same as or different from the second device.

In some embodiments, the location information request further includes at least one of the following:

an event trigger condition; and aperiodic reporting trigger or semi-persistent reporting activation.

In some embodiments, the location information corresponds to a PRS set instance.

In some embodiments, the method further includes:

determining, based on the location information request, whether to start reporting location information associated with a PRS set instance.

In some embodiments, the first period is different from the period T, and the method further includes:

reporting, by the first device, the first period and/or a cause for extending the period T.

In some embodiments, the first period is A instances of downlink positioning reference signal resource set DL-PRS Resource Set (instances of the DL-PRS Resource Set), and the method further includes: reporting, by the first device, a value of A, where A is a positive integer.

In some embodiments, the measurement time window includes at least one of the following:

positioning reference signals of one or more transmission and reception points TRPs;

a start time of the measurement time window;

a length of the measurement time window;

a period of the measurement time window; or a priority of the measurement time window.

In some embodiments, the method further includes:

the location information reported by the first device is associated with the first period and/or indication information of the first period; for example, the first period is 4 times the period T, only one measurement is performed for the first period, and 0010 indicates a measurement result of the 3rd period T in the first period; or the first device reports a correspondence between the location information and the measurement time window or a correspondence between the location information and a period of the measurement time window.

In some embodiments, the reported time information has a correspondence with a start time of the first period and/or a start time of an actual measurement period in the first period; or the reported time information has a correspondence with a start time of the measurement time window and/or a start time of an actual measurement period corresponding to the measurement time window.

In some embodiments, the reporting, by the first device, location information to the second device includes at least one of the following:

X1 or X2, where X1 or X2 is reported in a case that X1 or X2 is different from a value configured by the second device, for example, the LMF configures selecting one value for every two measurement results while the terminal selects one value for every four or one measurement result; or X1 or X2, in a case of reporting indicated by the second device.

In some embodiments, if within the MR, the MO, or the preset time window, a moving distance of the first device is less than a preset first threshold, and/or, a measurement result difference of the first device is less than a preset second threshold, reporting of the location information associated with the PRS set instance is not started; or if within the MR, the MO, or the preset time window, a moving distance of the first device is greater than a preset third threshold, and/or, a measurement result difference of the first device is greater than a preset fourth threshold, reporting of the location information associated with the PRS set instance is started.

An embodiment of this application further provides a positioning method, and as shown in FIG. 6, the method includes the following steps.

Step 201: A second device receives location information and time information that are reported by a first device, where the reported location information corresponds to a first-type location information, and the first-type location information includes at least one of the following:

location information associated with a first period of a positioning reference signal set instance PRS set instance;

location information associated with a measurement occasion MO;

location information associated with a measurement report MR; or location information associated with a measurement time window.

In some embodiments, the first period is greater than or equal to N times the period T of the positioning reference signal, where N is a positive integer and N depends on at least one of the following information:

carrier specific scaling factor CSSF;

number of receive beams;

period of measurement gap;

period of positioning reference signal;

processing capability of the first device;

PRS processing capability of the first device;

muting configuration of PRS; or first indication information, where the first indication information indicates that N is 1 or a default value or an integer greater than 1.

In some embodiments, the reported location information includes first information, and the first information includes at least one first information element, and the first information element includes at least one of the following:

reference signal received power RSRP measurement information;

reference signal time difference RSTD measurement information;

receive-transmit time difference Rx-Tx time difference measurement information;

time of arrival TOA measurement information;

time difference of arrival TDOA information;

downlink angle of departure AoD measurement information;

multi round-trip time Multi-RTT information;

observed time difference of arrival OTDOA measurement information;

assisted-global navigation satellite system A-gnss information;

sensor information;

enhanced cell identifier ECID positioning information;

absolute location information;

relative location information;

reference location information;

positioning reference signal identification information;

time identification information;

angle measurement information;

transmission and reception point identifier TRP ID information;

time information;

additional measurement information Additional measurement; or additional path list AdditionalPathList.

In some embodiments, the first information further includes at least one of the following:

second-type information, indicating a relationship between the first information element and PRS set instance, MO, MR, or measurement time window;

second indication information, indicating a relationship between the first information element and the number of PRS set instances, MOs, MRs, or measurement time windows; or first time information.

In some embodiments, in a case of being a first information element obtained for more than one PRS set instance, the first information element includes any one of the following:

first-item information: the first information element being first information element information obtained by filtering measurement information for more than one PRS set instance or measurement time window; and second-item information: the first information element being first information element information in one-to-one correspondence to measurement information for PRS set instances or measurement time windows.

In some embodiments, the method further includes:

receiving, by the second device, third indication information reported by the first device, where the third indication information indicates that the first information element includes the first-item information and/or the second-item information.

In some embodiments, the first information includes one, X1, or X2 first information elements, X1 and X2 being positive integers greater than 1, and the first information includes at least one of the following:

X1 first information elements obtained through measurement for X1 PRS set instances or measurement time windows;

X1 first information elements obtained through measurement for X1 PRS set instances or measurement time windows closest to a reporting time;

X1 first information elements obtained through measurement for X1 PRS set instances or measurement time windows before a preset reference time;

X1 first information elements obtained through measurement for X1 PRS set instances or measurement time windows within a preset time window;

X2 first information elements obtained through measurement for X2 MOs;

X2 first information elements obtained through measurement for X2 MOs closest to the reporting time;

X2 first information elements obtained through measurement for X2 MOs before the preset reference time; or X2 first information elements obtained through measurement for X2 MOs within the preset time window.

In some embodiments, the first information is first location information, and the first information element is a first location information element; or the first information is first positioning location information, and the first information element is first signal measurement information; or the first information is first signal measurement information, and the first information element is a first signal measurement list; or the first information is a first signal measurement list, and the first information element is a first signal measurement unit; or the first information is a first signal measurement unit, and the first information element is a first signal measurement value.

In some embodiments, the first signal measurement information includes one, X1, or X2 first signal measurement lists, X1 and X2 being positive integers, each of the first signal measurement lists includes B first signal measurement units, B being an integer less than or equal to nrMaxTRP, and nrMaxTRP is an integer greater than 1.

In some embodiments, the first signal measurement information includes one first signal measurement list and/or at least one of the following:

Y1-1 second signal measurement lists obtained through measurement for Y1-1 PRS set instances or measurement time windows;

Y1-1 second signal measurement lists obtained through measurement for Y1-1 PRS set instances or measurement time windows closest to a reporting time;

Y1-1 second signal measurement lists obtained through measurement for Y1-1 PRS set instances or measurement time windows before a preset reference time;

Y1-1 second signal measurement lists obtained through measurement for Y1-1 PRS set instances or measurement time windows within a preset time window;

Y2-1 second signal measurement lists obtained through measurement for Y2-1 MOs;

Y2-1 second signal measurement lists obtained through measurement for Y2-1 MOs closest to the reporting time;

Y2-1 second signal measurement lists obtained through measurement for Y2-1 MOs before the preset reference time; or Y2-1 second signal measurement lists obtained through measurement for Y2-1 MOs within the preset time window; where Y1 and Y2 are positive integers greater than 1.

In some embodiments, the first signal measurement list includes one first signal measurement unit and/or at least one of the following:

second signal measurement unit list;

Y1-1 second signal measurement units obtained through measurement for Y1-1 PRS set instances or measurement time windows;

Y1-1 second signal measurement units obtained through measurement for Y1-1 PRS set instances or measurement time windows closest to a reporting time;

Y1-1 second signal measurement units obtained through measurement for Y1-1 PRS set instances or measurement time windows before a preset reference time;

Y1-1 second signal measurement units obtained through measurement for Y1-1 PRS set instances or measurement time windows within a preset time window;

Y2-1 second signal measurement units obtained through measurement for Y2-1 MOs;

Y2-1 second signal measurement units obtained through measurement for Y2-1 MOs closest to the reporting time;

Y2-1 second signal measurement units obtained through measurement for Y2-1 MOs before the preset reference time; or Y2-1 second signal measurement units obtained through measurement for Y2-1 MOs within the preset time window; where Y1 and Y2 are positive integers greater than 1.

In some embodiments, the method further includes:

sending, by the second device, a location information request to the first device, where the location information request includes at least one of the following indication information:

a location information request for more than one PRS set instance or measurement time window;

a location information request corresponding to a PRS set instance;

the number of PRS set instances, MOs, or measurement time windows corresponding to location information;

value of X1 or X2;

measurement time window information;

priority information; or reference time information.

In some embodiments, the location information request further includes at least one of the following:

an event trigger condition; or aperiodic reporting trigger or semi-persistent reporting activation.

In some embodiments, the location information corresponds to a PRS set instance.

In some embodiments, the first period is different from the period T, and the method further includes:

receiving, by the second device, the first period and/or a cause for extending the period T that is reported by the first device.

In some embodiments, the first period is A instances of downlink positioning reference signal resource set DL-PRS Resource Set, and the method further includes:

receiving, by the second device, a value of A reported by the first device, where A is a positive integer.

In some embodiments, the measurement time window includes at least one of the following:

positioning reference signals of one or more transmission and reception points TRPs;

a start time of the measurement time window;

a length of the measurement time window;

a period of the measurement time window; or a priority of the measurement time window.

In some embodiments, the method further includes:

receiving, by the second device, association between the location information reported by the first device and the first period and/or indication information of the first period; or receiving, by the second device, a correspondence between the location information reported by the first device and the measurement time window or a correspondence between the location information and a period of the measurement time window.

In some embodiments, the reported time information has a correspondence with a start time of the first period and/or a start time of an actual measurement period in the first period; or the reported time information has a correspondence with a start time of the measurement time window and/or a start time of an actual measurement period corresponding to the measurement time window.

Figure 7:
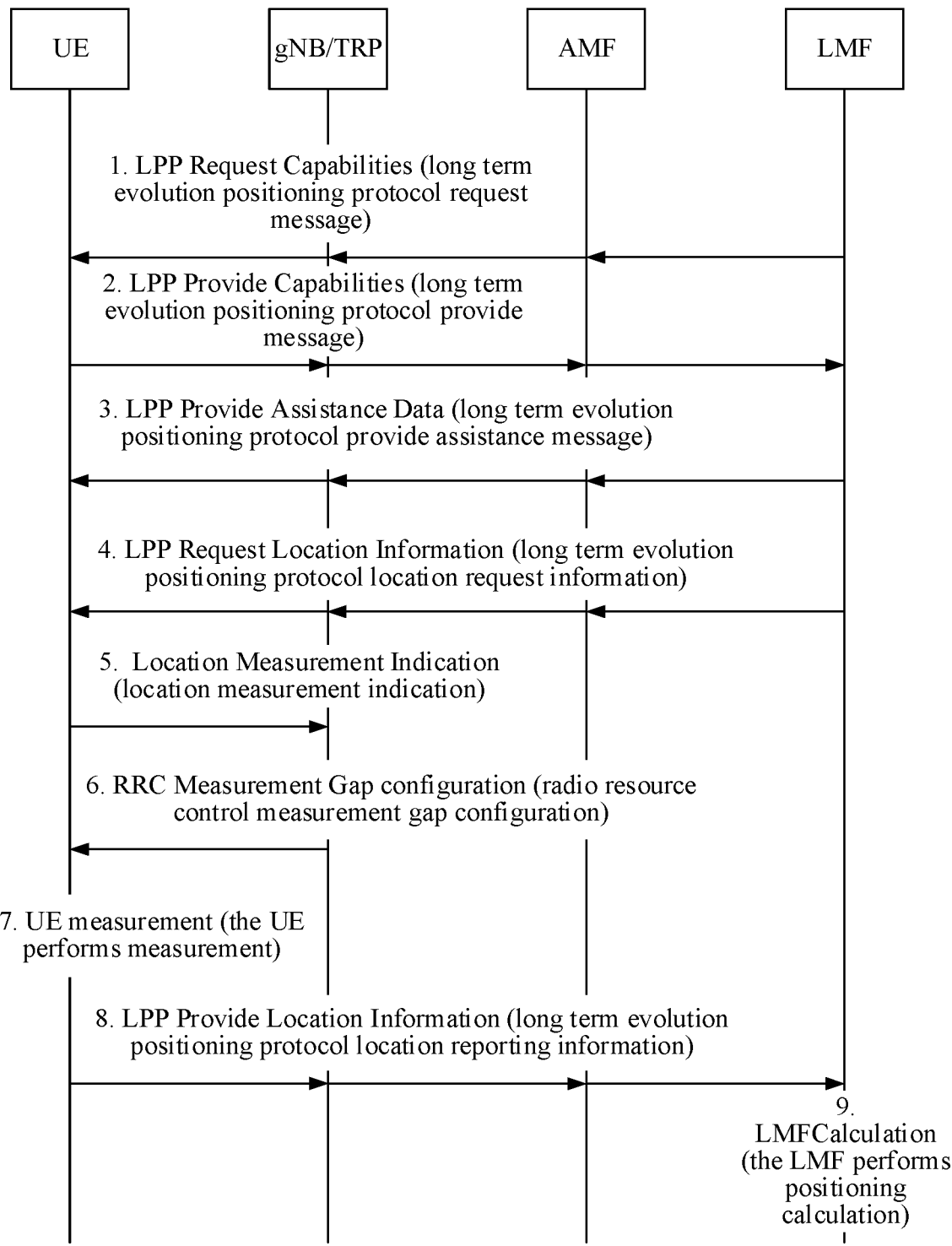
FIG. 7 is a schematic flowchart of a positioning method according to a specific embodiment of this application.

Specifically, the first device may be UE, the second device may be an LMF, and the third device may be an LMF or other network-side devices, such as a base station. As shown in FIG. 7, the processing method in this embodiment may include the following steps.

Step 1. The LMF sends LPP Request Capabilities (long term evolution positioning protocol request message) to the UE through an AMF and a gNB/TRP.

Step 2. The UE sends LPP Provide Capabilities (long term evolution positioning protocol provide message) to the LMF through the AMF and the gNB/TRP.

Step 3. The LMF sends LPP Provide Assistance Data (long term evolution positioning protocol provide assistance message) to the UE through the AMF and the gNB/TRP.

Step 4. The LMF sends LPP Request Location Information (long term evolution positioning protocol location request information) to the UE through the AMF and the gNB/TRP.

Step 5. The UE sends RRC Location Measurement Indication (radio resource control location measurement indication) to the gNB/TRP.

Step 6. The gNB/TRP sends RRC Measurement Gap configuration (radio resource control measurement gap configuration) to the UE.

Step 7. The UE performs measurement.

Step 8. The UE sends LPP Request Location Information (long term evolution positioning protocol location reporting information) to the LMF through the AMF and the gNB/TRP.

Step 9. The LMF performs positioning calculation.

For MT-LR (Mobile Terminated Location Request, mobile terminal location request), because the LMF needs merely to obtain the UE capability once, step 1 and step 2 are not necessary.

The above procedure considers the worst cases, including acquiring assistance data and using measurement gap.

The network-side device may indicate, to the UE, one piece of NR-DL-TDOA-SignalMeasurementInformation (signal measurement information) corresponding to one or N MOs/MRs/MIs (measurement instances).

The network side may indicate, to the UE, DL RSTD, DL PRS-RSRP, and UE Rx-Tx time difference corresponding to one or N MO s/MRs/MIs. For DL RSTD, DL PRS-RSRP, and UE Rx-Tx time difference, the UE may report an associated higher-layer parameter nr-TimeStamp (time stamp), where nr-TimeStamp is for measurement timing or PRS transmission timing.

In this embodiment, the location reporting information sent by the UE to the LMF may include the following content.

| Information |
| --- |
| PCI, GCI, and TRP ID for each measurement |
| DL-PRS-RSRP measurement |
| UE Rx-Tx time difference measurement (multiple measurement instance, multiple measurement instance) |
| Time stamp of the measurement (including instance, MO, MR, first period, and actual measurement period) |
| Quality for each measurement |

PCI, GO, and TRP ID for each measurement are PCI, GCI, and TRP ID for each measurement;

DL-PRS-RSRP measurement is downlink PRS RSRP measurement;

UE Rx-Tx time difference measurement is terminal receive-transmit time difference measurement;

time stamp of the measurement is a time stamp of measurement; and quality for each measurement is quality for each measurement.

In this embodiment, a target device provides NR DL-TDOA measurement to a location server using NR-DL-TDOA-SignalMeasurementInformation (new radio-downlink-time difference of arrival-signal measurement information), where dl-PRS-ReferenceInfo defines an "RSTD reference" TRP, and nr-RSTD's and nr-RSTD-ResultDiff's in nr-DL-TDOA-MeasList are provided relative to the "RSTD reference" TRP.

The "RSTD reference" TRP may be the same as or different from the "assistance data reference" TRP provided in nr-DL-PRS-ReferenceInfo of NR-DL-PRS-Assistance-Data.

The target device includes a value of zero for nr-RSTD and nr-RSTD-ResultDiff of the "RSTD reference" TRP in nr-DL-TDOA-MeasList. NR-DL-TDOA-MeasvalueList includes the number to be reported in one reporting.

It should be noted that, for the positioning method provided in this embodiment of this application, the execution body may be a positioning apparatus, or a module for executing and loading the positioning method in the positioning apparatus. In the embodiments of this application, the positioning method provided in the embodiments of this application is described by using the positioning method being executed by the positioning apparatus as an example.

Figure 8:
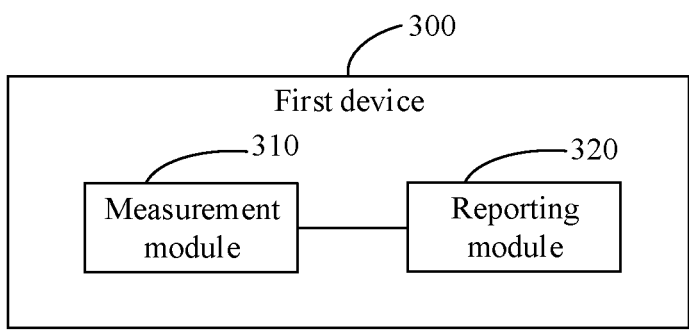
FIG. 8 is a schematic structural diagram of a positioning apparatus applied to a first device according to an embodiment of this application.

An embodiment of this application provides a positioning apparatus, applied to a first device 300. As shown in FIG. 8, the apparatus includes:

a measurement module 310, configured to perform measurement on a positioning reference signal PRS; and a reporting module 320, configured to report location information and time information to a second device, where the reported location information corresponds to a first-type location information, and the first-type location information includes at least one of the following:

location information associated with a first period of a positioning reference signal set instance PRS set instance;

location information associated with a measurement occasion (MO);

location information associated with a measurement report (MR); or location information associated with a measurement time window.

In some embodiments, the reporting module 320 is configured to:

N1 pieces of location information are reported for one MO; or at least one piece of location information is reported for a period T of M1 PRS set instances or a first period; or N2 pieces of location information are reported for one MR period; or at least one piece of location information is reported for M2 MOs; or K1 pieces of location information are reported for one measurement time window; or at least one piece of location information is reported for K2 measurement time windows; where N1, M1, N2, M2, K1, and K2 are positive integers.

In some embodiments, the first period is greater than or equal to N times the period T of the positioning reference signal, where N is a positive integer and N depends on at least one of the following information:

carrier specific scaling factor CSSF;

number of receive beams;

period of measurement gap;

period of positioning reference signal;

processing capability of the first device;

PRS processing capability of the first device;

muting configuration of PRS; or first indication information, where the first indication information indicates that N is 1 or a default value or an integer greater than 1.

In some embodiments, the reported location information includes first information, and the first information includes at least one first information element, and the first information element includes at least one of the following:

reference signal received power (RSRP) measurement information;

reference signal time difference (RSTD) measurement information;

receive-transmit time difference Rx-Tx time difference measurement information;

time of arrival (TOA) measurement information;

time difference of arrival (TDOA) information;

downlink angle of departure (AoD) measurement information;

multi round-trip time Multi-RTT information;

observed time difference of arrival (OTDOA) measurement information;

assisted-global navigation satellite system (A-gnss) information;

sensor information;

enhanced cell identifier (ECID) positioning information;

absolute location information;

relative location information;

reference location information;

positioning reference signal identification information;

time identification information;

angle measurement information;

transmission and reception point identifier (TRP ID) information;

time information;

additional measurement information Additional measurement; and additional path list (AdditionalPathList).

In some embodiments, the first information further includes at least one of the following:

second-type information, indicating a relationship between the first information element and PRS set instance, MO, MR, or measurement time window;

second indication information, indicating a relationship between the first information element and the number of PRS set instances, MOs, MRs, or measurement time windows; or first time information.

In some embodiments, in a case of being a first information element obtained for more than one PRS set instance, the first information element includes any one of the following:

first-item information: the first information element being first information element information obtained by filtering measurement information for more than one PRS set instance or measurement time window; and second-item information: the first information element being first information element information in one-to-one correspondence to measurement information for PRS set instances or measurement time windows.

In some embodiments, the reporting module is further configured to report third indication information, indicating that the first information element includes the first-item information and/or the second-item information.

In some embodiments, the first information includes one, X1, or X2 first information elements, X1 and X2 being positive integers greater than 1, and the first information includes at least one of the following:

X1 first information elements obtained through measurement for X1 PRS set instances or measurement time windows;

X1 first information elements obtained through measurement for X1 PRS set instances or measurement time windows closest to a reporting time;

X1 first information elements obtained through measurement for X1 PRS set instances or measurement time windows before a preset reference time;

X1 first information elements obtained through measurement for X1 PRS set instances or measurement time windows within a preset time window;

X2 first information elements obtained through measurement for X2 MOs;

X2 first information elements obtained through measurement for X2 MOs closest to the reporting time;

X2 first information elements obtained through measurement for X2 MOs before the preset reference time; or X2 first information elements obtained through measurement for X2 MOs within the preset time window.

In some embodiments, the first information is first location information, and the first information element is a first location information element; or the first information is first positioning location information, and the first information element is first signal measurement information; or the first information is first signal measurement information, and the first information element is a first signal measurement list; or the first information is a first signal measurement list, and the first information element is a first signal measurement unit; or the first information is a first signal measurement unit, and the first information element is a first signal measurement value.

In some embodiments, the first signal measurement information includes one, X1, or X2 first signal measurement lists, X1 and X2 being positive integers, each of the first signal measurement lists includes B first signal measurement units, B being an integer less than or equal to nrMaxTRP, and nrMaxTRP is an integer greater than 1.

In some embodiments, the first signal measurement information includes one first signal measurement list and/or at least one of the following:

Y1-1 second signal measurement lists obtained through measurement for Y1-1 PRS set instances or measurement time windows;

Y1-1 second signal measurement lists obtained through measurement for Y1-1 PRS set instances or measurement time windows closest to a reporting time;

Y1-1 second signal measurement lists obtained through measurement for Y1-1 PRS set instances or measurement time windows before a preset reference time;

Y1-1 second signal measurement lists obtained through measurement for Y1-1 PRS set instances or measurement time windows within a preset time window;

Y2-1 second signal measurement lists obtained through measurement for Y2-1 MOs;

Y2-1 second signal measurement lists obtained through measurement for Y2-1 MOs closest to the reporting time;

Y2-1 second signal measurement lists obtained through measurement for Y2-1 MOs before the preset reference time; or Y2-1 second signal measurement lists obtained through measurement for Y2-1 MOs within the preset time window; where Y1 and Y2 are positive integers greater than 1.

In some embodiments, the first signal measurement list includes one first signal measurement unit and/or at least one of the following:

second signal measurement unit list;

Y1-1 second signal measurement units obtained through measurement for Y1-1 PRS set instances or measurement time windows;

Y1-1 second signal measurement units obtained through measurement for Y1-1 PRS set instances or measurement time windows closest to a reporting time;

Y1-1 second signal measurement units obtained through measurement for Y1-1 PRS set instances or measurement time windows before a preset reference time;

Y1-1 second signal measurement units obtained through measurement for Y1-1 PRS set instances or measurement time windows within a preset time window;

Y2-1 second signal measurement units obtained through measurement for Y2-1 MOs;

Y2-1 second signal measurement units obtained through measurement for Y2-1 MOs closest to the reporting time;

Y2-1 second signal measurement units obtained through measurement for Y2-1 MOs before the preset reference time; or Y2-1 second signal measurement units obtained through measurement for Y2-1 MOs within the preset time window; where Y1 and Y2 are positive integers greater than 1.

In some embodiments, the apparatus further includes:

a receiving module, configured to receive a location information request of the second device, where the location information request includes at least one of the following indication information:

a location information request for more than one PRS set instance or measurement time window;

a location information request corresponding to a PRS set instance;

the number of PRS set instances, MOs, or measurement time windows corresponding to location information;

value of X1 or X2;

measurement time window information;

priority information; or reference time information.

In some embodiments, the location information request further includes at least one of the following:

an event trigger condition; or aperiodic reporting trigger or semi-persistent reporting activation.

In some embodiments, the location information corresponds to a PRS set instance.

In some embodiments, the reporting module is further configured to determine, based on the location information request, whether to start reporting location information associated with a PRS set instance.

In some embodiments, the first period is different from the period T, and the reporting module is further configured to report the first period and/or a cause for extending the period T.

In some embodiments, the first period is A instances of downlink positioning reference signal resource set DL-PRS Resource Set, and the reporting module is further configured to report a value of A, where A is a positive integer.

In some embodiments, the measurement time window includes at least one of the following:

positioning reference signals of one or more transmission and reception points TRPs;

a start time of the measurement time window;

a length of the measurement time window;

a period of the measurement time window; or a priority of the measurement time window.

In some embodiments, the reporting module is further configured to report a first period associated with a current measurement and/or period indication information in a first period of measurement; or report, for the first device, a correspondence between the location information and the measurement time window or a correspondence between the location information and a period of the measurement time window.

In some embodiments, the reported time information has a correspondence with a start time of the first period and/or a start time of an actual measurement period in the first period; or the reported time information has a correspondence with a start time of the measurement time window and/or a start time of an actual measurement period corresponding to the measurement time window.

In some embodiments, the reporting module is configured to perform at least one of the following:

X1 or X2, where X1 or X2 is reported in a case that X1 or X2 is different from a value configured by the second device; or X1 or X2, in a case of reporting indicated by the second device.

In an embodiment, if within the MR, the MO, or the preset time window, a moving distance of the first device is less than a preset first threshold, and/or, a measurement result difference of the first device is less than a preset second threshold, reporting of the location information associated with the PRS set instance is not started; or if within the MR, the MO, or the preset time window, a moving distance of the first device is greater than a preset third threshold, and/or, a measurement result difference of the first device is greater than a preset fourth threshold, reporting of the location information associated with the PRS set instance is started.

The positioning apparatus in this embodiment of this application may be an apparatus, or an apparatus or an electric device having an operating system, or may be a component, an integrated circuit, or a chip in a terminal. The apparatus or electric device may be a mobile terminal or a non-mobile terminal. For example, the mobile terminal may include but is not limited to the types of the terminal 11 listed above, and the non-mobile terminal may be a server, a network attached storage (NAS), a personal computer (C), a television (TV), a teller machine, a self-service machine, or the like, which is not specifically limited in this embodiment of this application.

The positioning apparatus provided in this embodiment of this application is capable of implementing the processes implemented in the method embodiment shown in FIG. 5, with the same technical effects achieved. To avoid repetition, details are not described herein again.

Figure 9:
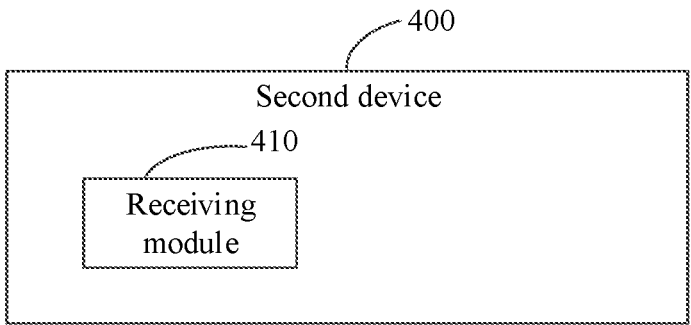
FIG. 9 is a schematic structural diagram of a positioning apparatus applied to a second device according to an embodiment of this application.

An embodiment of this application provides a positioning apparatus, applied to a second device 400. As shown in FIG. 9, the apparatus includes:

a receiving module 410, configured to receive location information and time information that are reported by a first device, where the reported location information corresponds to a first-type location information, and the first-type location information includes at least one of the following:

location information associated with a first period of a positioning reference signal set instance PRS set instance;

location information associated with a measurement occasion (MO);

location information associated with a measurement report (MR); or location information associated with a measurement time window.

In some embodiments, the first period is greater than or equal to N times the period T of the positioning reference signal, where N is a positive integer and N depends on at least one of the following information:

carrier specific scaling factor (CSSF);

number of receive beams;

period of measurement gap;

period of positioning reference signal;

processing capability of the first device;

PRS processing capability of the first device;

muting configuration of PRS; or first indication information, where the first indication information indicates that N is 1 or a default value or an integer greater than 1.

In some embodiments, the reported location information includes first information, and the first information includes at least one first information element, and the first information element includes at least one of the following:

reference signal received power (RSRP) measurement information;

reference signal time difference (RSTD) measurement information;

receive-transmit time difference (Rx-Tx time difference) measurement information;

time of arrival (TOA) measurement information;

time difference of arrival (TDOA) information;

downlink angle of departure (AoD) measurement information;

multi round-trip time (Multi-RTT) information;

observed time difference of arrival (OTDOA) measurement information;

assisted-global navigation satellite system (A-gnss) information;

sensor information;

enhanced cell identifier (ECID) positioning information;

absolute location information;

relative location information;

reference location information;

positioning reference signal identification information;

time identification information;

angle measurement information;

transmission and reception point identifier (TRP ID) information;

time information;

additional measurement information Additional measurement; or additional path list (AdditionalPathList).

In some embodiments, the first information further includes at least one of the following:

second-type information, indicating a relationship between the first information element and PRS set instance, MO, MR, or measurement time window;

second indication information, indicating a relationship between the first information element and the number of PRS set instances, MOs, MRs, or measurement time windows; or first time information.

In some embodiments, in a case of being a first information element obtained for more than one PRS set instance, the first information element includes any one of the following:

first-item information: the first information element being first information element information obtained by filtering measurement information for more than one PRS set instance or measurement time window; and second-item information: the first information element being first information element information in one-to-one correspondence to measurement information for PRS set instances or measurement time windows.

In some embodiments, the receiving module 410 is further configured to receive third indication information reported by the first device, where the third indication information indicates that the first information element includes the first-item information and/or the second-item information.

In some embodiments, the first information includes one, X1, or X2 first information elements, X1 and X2 being positive integers greater than 1, and the first information includes at least one of the following:

X1 first information elements obtained through measurement for X1 PRS set instances or measurement time windows;

X1 first information elements obtained through measurement for X1 PRS set instances or measurement time windows closest to a reporting time;

X1 first information elements obtained through measurement for X1 PRS set instances or measurement time windows before a preset reference time;

X1 first information elements obtained through measurement for X1 PRS set instances or measurement time windows within a preset time window;

X2 first information elements obtained through measurement for X2 MOs;

X2 first information elements obtained through measurement for X2 MOs closest to the reporting time;

X2 first information elements obtained through measurement for X2 MOs before the preset reference time; or X2 first information elements obtained through measurement for X2 MOs within the preset time window.

In some embodiments, the first information is first location information, and the first information element is a first location information element; or the first information is first positioning location information, and the first information element is first signal measurement information; or the first information is first signal measurement information, and the first information element is a first signal measurement list; or the first information is a first signal measurement list, and the first information element is a first signal measurement unit; or the first information is a first signal measurement unit, and the first information element is a first signal measurement value.

In some embodiments, the first signal measurement information includes one, X1, or X2 first signal measurement lists, X1 and X2 being positive integers, each of the first signal measurement lists includes B first signal measurement units, B being an integer less than or equal to nrMaxTRP, and nrMaxTRP is an integer greater than 1.

In some embodiments, the first signal measurement information includes one first signal measurement list and/or at least one of the following:

Y1-1 second signal measurement lists obtained through measurement for Y1-1 PRS set instances or measurement time windows;

Y1-1 second signal measurement lists obtained through measurement for Y1-1 PRS set instances or measurement time windows closest to a reporting time;

Y1-1 second signal measurement lists obtained through measurement for Y1-1 PRS set instances or measurement time windows before a preset reference time;

Y1-1 second signal measurement lists obtained through measurement for Y1-1 PRS set instances or measurement time windows within a preset time window;

Y2-1 second signal measurement lists obtained through measurement for Y2-1 MOs;

Y2-1 second signal measurement lists obtained through measurement for Y2-1 MOs closest to the reporting time;

Y2-1 second signal measurement lists obtained through measurement for Y2-1 MOs before the preset reference time; or Y2-1 second signal measurement lists obtained through measurement for Y2-1 MOs within the preset time window; where Y1 and Y2 are positive integers greater than 1.

In some embodiments, the first signal measurement list includes one first signal measurement unit and/or at least one of the following:

second signal measurement unit list;

Y1-1 second signal measurement units obtained through measurement for Y1-1 PRS set instances or measurement time windows;

Y1-1 second signal measurement units obtained through measurement for Y1-1 PRS set instances or measurement time windows closest to a reporting time;

Y1-1 second signal measurement units obtained through measurement for Y1-1 PRS set instances or measurement time windows before a preset reference time;

Y1-1 second signal measurement units obtained through measurement for Y1-1 PRS set instances or measurement time windows within a preset time window;

Y2-1 second signal measurement units obtained through measurement for Y2-1 MOs;

Y2-1 second signal measurement units obtained through measurement for Y2-1 MOs closest to the reporting time;

Y2-1 second signal measurement units obtained through measurement for Y2-1 MOs before the preset reference time; or Y2-1 second signal measurement units obtained through measurement for Y2-1 MOs within the preset time window; where Y1 and Y2 are positive integers greater than 1.

In some embodiments, the receiving module 410 is further configured to send a location information request to the first device, where the location information request includes at least one of the following indication information:

a location information request for more than one PRS set instance or measurement time window;

a location information request corresponding to a PRS set instance;

the number of PRS set instances, MOs, or measurement time windows corresponding to location information;

value of X1 or X2;

measurement time window information;

priority information; or reference time information.

In some embodiments, the location information request further includes at least one of the following:

an event trigger condition; or aperiodic reporting trigger or semi-persistent reporting activation.

In some embodiments, the location information corresponds to a PRS set instance.

In some embodiments, the first period is different from the period T, and the receiving module 410 is further configured to receive the first period and/or a reason for extending the period T reported by the first device.

In some embodiments, the first period is A instances of downlink positioning reference signal resource set DL-PRS Resource Set, and the receiving module 410 is further configured to receive a value of A reported by the first device, where A is a positive integer.

In some embodiments, the measurement time window includes at least one of the following:

positioning reference signals of one or more transmission and reception points TRPs;
   a start time of the measurement time window;
   a length of the measurement time window;
   a period of the measurement time window; or
   a priority of the measurement time window.

In some embodiments, the receiving module 410 is further configured to receive a first period associated with a current measurement and/or period indication information in a first period of measurement reported by the first device; or receive a correspondence between the current measurement and the measurement time window or a correspondence between the current measurement and a period of the measurement time window reported by the first device.

In some embodiments, the reported time information has a correspondence with a start time of the first period and/or a start time of an actual measurement period in the first period; or the reported time information has a correspondence with a start time of the measurement time window and/or a start time of an actual measurement period corresponding to the measurement time window.

The positioning apparatus provided in this embodiment of this application is capable of implementing the processes implemented in the method embodiment shown in FIG. 6, with the same technical effects achieved. To avoid repetition, details are not described herein again.

Figure 10:
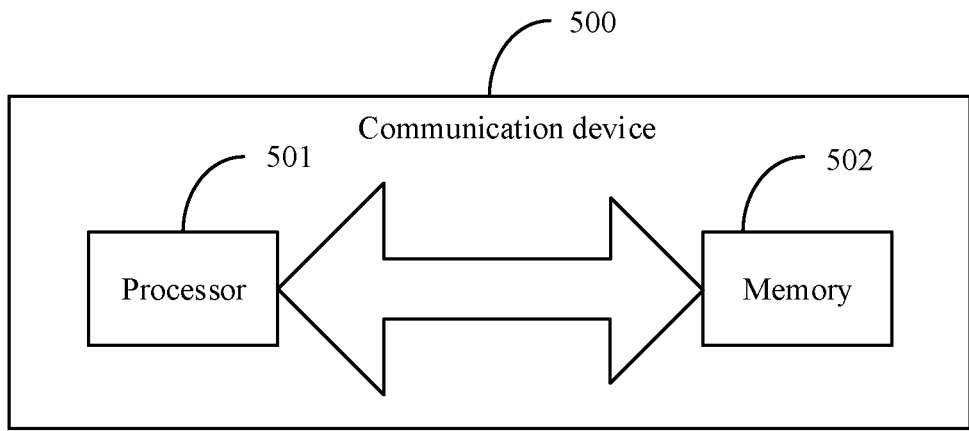
FIG. 10 is a schematic structural diagram of a communication device according to an embodiment of this application.

Optionally, as shown in FIG. 10, an embodiment of this application further provides a communication device 500, including a processor 501, a memory 502, and a program or instructions stored in the memory 502 and capable of running on the processor 501. For example, when the communication device 500 is a terminal and when the program or the instructions are executed by the processor 501, the processes of the foregoing embodiments of the positioning method applied to a first device are implemented, with the same technical effects achieved. When the communication device 500 is a network-side device and when the program or the instructions are executed by the processor 501, the processes of the foregoing positioning method embodiments applied to a second device are implemented, with the same technical effects achieved. To avoid repetition, details are not described herein again.

An embodiment of this application further provides a terminal, including a processor and a communication interface. The processor is configured to perform measurement on a positioning reference signal PRS, and the communication interface is configured to report location information and time information to a second device. The reported location information corresponds to first-type location information. The terminal embodiment corresponds to the foregoing terminal (that is, the first device) side method embodiment, and all implementation processes and implementations of the foregoing method embodiment can be applied to the terminal embodiment, with the same

Figure 11:
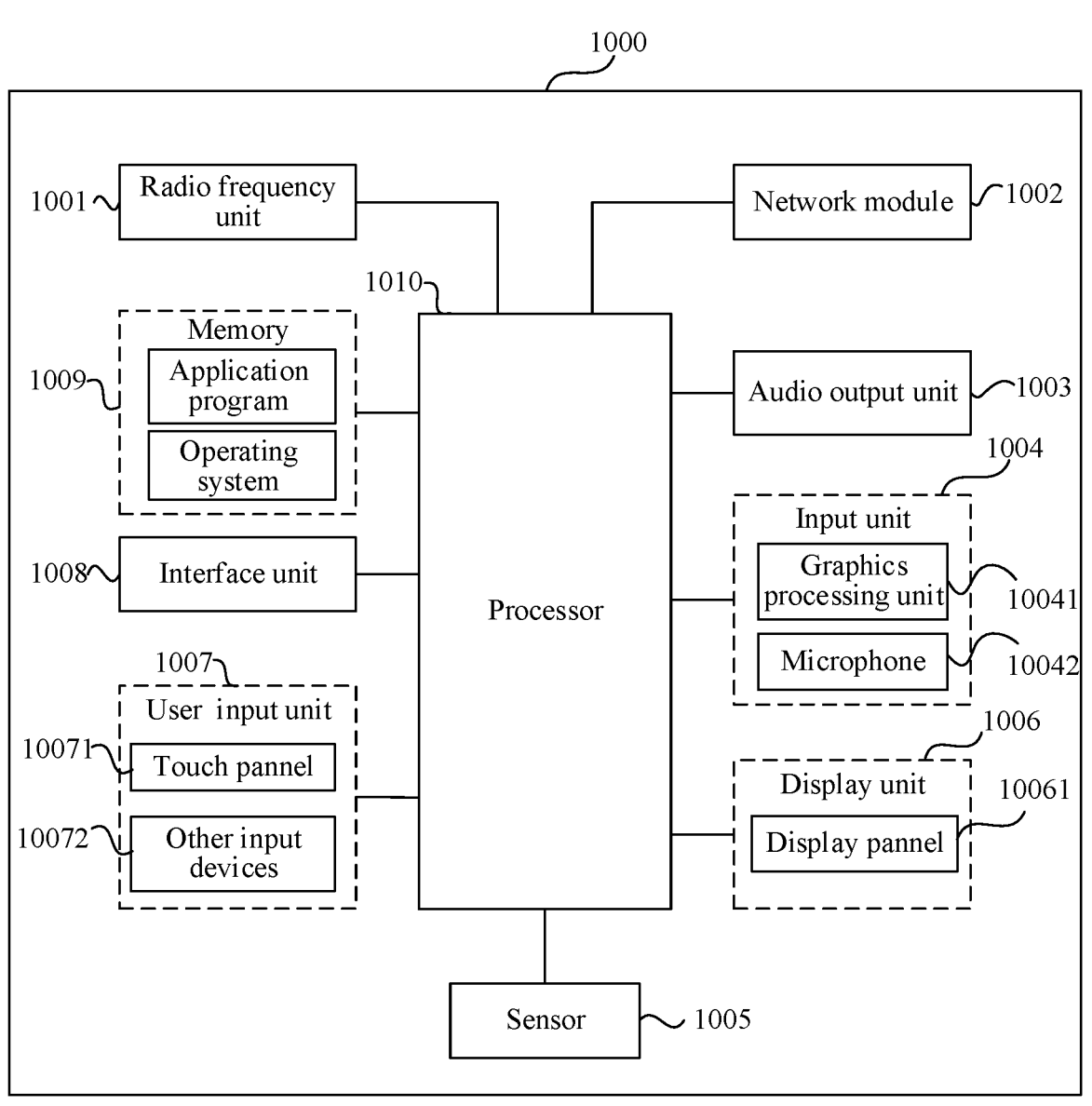
FIG. 11 is a schematic compositional diagram of a terminal according to an embodiment of this application.

30 technical effects achieved. Specifically, FIG. 11 is a schematic diagram of a hardware structure of a terminal for implementing the embodiments of this application.

The terminal 1000 includes but is not limited to at least part of components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

Persons skilled in the art can understand that the terminal 1000 may further include a power supply (for example, a battery) supplying power to the components, and the power supply may be logically connected to the processor 1010 through a power management system. In this way, functions such as charge management, discharge management, and power consumption management are implemented by using the power management system. The structure of the terminal shown in FIG. 11 does not constitute any limitation on the terminal. The terminal may include more or fewer components than those shown in the figure, or a combination of some components, or the components disposed differently. Details are not described herein again.

It can be understood that in this embodiment of this application, the input unit 1004 may include a graphics processing unit (GPU) 10041 and a microphone 10042. The graphics processing unit 10041 processes image data of a still picture or video obtained by an image capture apparatus (such as a camera) in a video capture mode or an image capture mode. The display unit 1006 may include a display panel 10061, and the display panel 10061 may be configured in a form of a liquid crystal display, an organic light-emitting diode, and the like. The user input unit 1007 may include a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function key (such as a volume control key or a power on/off key), a trackball, a mouse, a joystick, and the like. Details are not described herein.

In this embodiment of this application, the radio frequency unit 1001 receives downlink data from a network-side device, and then sends the downlink data to the processor 1010 for processing; and also sends uplink data to the network-side device. Generally, the radio frequency unit 1001 includes but is not limited to an antenna, at least one amplifier, a transceiver, a coupler, a low noise amplifier, a duplexer, and the like.

The memory 1009 may be configured to store software programs or instructions and various data. The memory 1009 may include a program or instruction storage area and a data storage area. The program or instruction storage area may store an operating system, an application program or instruction required by at least one function (for example, a sound playback function or an image playback function), and the like. In addition, the memory 1009 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device.

The processor 1010 may include one or more processing units. Optionally, an application processor and a modem processor may be integrated in the processor 1010. The application processor primarily processes an operating system, user interfaces, application programs or instructions, and the like. The modem processor primarily processes radio communication, for example, being a baseband processor. It can be understood that the modem processor may alternatively be not integrated in the processor 1010.

The processor 1010 is configured to perform measurement on a positioning reference signal PRS; and report location information and time information to a second device, where the reported location information corresponds to a first-type location information, and the first-type location information includes at least one of the following:

location information associated with a first period of a positioning reference signal set instance PRS set instance;

location information associated with a measurement occasion MO;

location information associated with a measurement report MR; or location information associated with a measurement time window.

In some embodiments, the processor 1010 is configured to:

N1 pieces of location information are reported for one MO; or at least one piece of location information is reported for a period T of M1 PRS set instances or a first period; or N2 pieces of location information are reported for one MR period; or at least one piece of location information is reported for M2 MOs; or K1 pieces of location information are reported for one measurement time window; or at least one piece of location information is reported for K2 measurement time windows; where N1, M1, N2, M2, K1, and K2 are positive integers.

In some embodiments, the first period is greater than or equal to N times the period T of the positioning reference signal, where N is a positive integer and N depends on at least one of the following information:

carrier specific scaling factor CSSF;

number of receive beams;

period of measurement gap;

period of positioning reference signal;

processing capability of the first device;

PRS processing capability of the first device;

muting configuration of PRS; or first indication information, where the first indication information indicates that N is 1 or a default value or an integer greater than 1.

In some embodiments, the reported location information includes first information, and the first information includes at least one first information element, and the first information element includes at least one of the following:

reference signal received power (RSRP) measurement information;

reference signal time difference (RSTD) measurement information;

receive-transmit time difference (Rx-Tx time difference) measurement information;

time of arrival (TOA) measurement information;

time difference of arrival (TDOA) information;

downlink angle of departure (AoD) measurement information;

multi round-trip time (Multi-RTT) information;

observed time difference of arrival (OTDOA) measurement information;

assisted-global navigation satellite system (A-gnss) information;

sensor information;

enhanced cell identifier (ECID) positioning information;

absolute location information;

relative location information;

reference location information;

positioning reference signal identification information;

time identification information;

angle measurement information;

transmission and reception point identifier (TRP ID) information;

time information;

additional measurement information (Additional measurement); or additional path list (AdditionalPathList).

In some embodiments, the first information further includes at least one of the following:

second-type information, indicating a relationship between the first information element and PRS set instance, MO, MR, or measurement time window;

second indication information, indicating a relationship between the first information element and the number of PRS set instances, MOs, MRs, or measurement time windows; or first time information.

In some embodiments, in a case of being a first information element obtained for more than one PRS set instance, the first information element includes any one of the following:

first-item information: the first information element being first information element information obtained by filtering measurement information for more than one PRS set instance or measurement time window; and second-item information: the first information element being first information element information in one-to-one correspondence to measurement information for PRS set instances or measurement time windows.

In some embodiments, the processor 1010 is further configured to report third indication information, indicating that the first information element includes the first-item information and/or the second-item information.

In some embodiments, the first information includes one, X1, or X2 first information elements, X1 and X2 being positive integers greater than 1, and the first information includes at least one of the following:

X1 first information elements obtained through measurement for X1 PRS set instances or measurement time windows;

X1 first information elements obtained through measurement for X1 PRS set instances or measurement time windows closest to a reporting time;

X1 first information elements obtained through measurement for X1 PRS set instances or measurement time windows before a preset reference time;

X1 first information elements obtained through measurement for X1 PRS set instances or measurement time windows within a preset time window;

X2 first information elements obtained through measurement for X2 MOs;

X2 first information elements obtained through measurement for X2 MOs closest to the reporting time;

X2 first information elements obtained through measurement for X2 MOs before the preset reference time; or X2 first information elements obtained through measurement for X2 MOs within the preset time window.

In some embodiments, the first information is first location information, and the first information element is a first location information element; or the first information is first positioning location information, and the first information element is first signal measurement information; or the first information is first signal measurement information, and the first information element is a first signal measurement list; or the first information is a first signal measurement list, and the first information element is a first signal measurement unit; or the first information is a first signal measurement unit, and the first information element is a first signal measurement value.

In some embodiments, the first signal measurement information includes one, X1, or X2 first signal measurement lists, X1 and X2 being positive integers, each of the first signal measurement lists includes B first signal measurement units, B being an integer less than or equal to nrMaxTRP, and nrMaxTRP is an integer greater than 1.

In some embodiments, the first signal measurement information includes one first signal measurement list and/or at least one of the following:

Y1-1 second signal measurement lists obtained through measurement for Y1-1 PRS set instances or measurement time windows;

Y1-1 second signal measurement lists obtained through measurement for Y1-1 PRS set instances or measurement time windows closest to a reporting time;

Y1-1 second signal measurement lists obtained through measurement for Y1-1 PRS set instances or measurement time windows before a preset reference time;

Y1-1 second signal measurement lists obtained through measurement for Y1-1 PRS set instances or measurement time windows within a preset time window;

Y2-1 second signal measurement lists obtained through measurement for Y2-1 MOs;

Y2-1 second signal measurement lists obtained through measurement for Y2-1 MOs closest to the reporting time;

Y2-1 second signal measurement lists obtained through measurement for Y2-1 MOs before the preset reference time; or Y2-1 second signal measurement lists obtained through measurement for Y2-1 MOs within the preset time window; where Y1 and Y2 are positive integers greater than 1.

In some embodiments, the first signal measurement list includes one first signal measurement unit and/or at least one of the following:

second signal measurement unit list;

Y1-1 second signal measurement units obtained through measurement for Y1-1 PRS set instances or measurement time windows;

Y1-1 second signal measurement units obtained through measurement for Y1-1 PRS set instances or measurement time windows closest to a reporting time;

Y1-1 second signal measurement units obtained through measurement for Y1-1 PRS set instances or measurement time windows before a preset reference time;

Y1-1 second signal measurement units obtained through measurement for Y1-1 PRS set instances or measurement time windows within a preset time window;

Y2-1 second signal measurement units obtained through measurement for Y2-1 MOs;

Y2-1 second signal measurement units obtained through measurement for Y2-1 MOs closest to the reporting time;

Y2-1 second signal measurement units obtained through measurement for Y2-1 MOs before the preset reference time; or Y2-1 second signal measurement units obtained through measurement for Y2-1 MOs within the preset time window; where Y1 and Y2 are positive integers greater than 1.

In some embodiments, the processor 1010 is further configured to receive a location information request of the second device, where the location information request includes at least one of the following indication information:

a location information request for more than one PRS set instance or measurement time window;

a location information request corresponding to a PRS set instance;

the number of PRS set instances, MOs, or measurement time windows corresponding to location information;

value of X1 or X2;

measurement time window information;

priority information; or reference time information.

In some embodiments, the location information request further includes at least one of the following:

an event trigger condition; or aperiodic reporting trigger or semi-persistent reporting activation.

In some embodiments, the location information corresponds to a PRS set instance.

In some embodiments, the processor 1010 is further configured to determine, based on the location information request, whether to start reporting location information associated with a PRS set instance.

In some embodiments, the first period is different from the period T, and the processor 1010 is further configured to report the first period and/or a cause for extending the period T.

In some embodiments, the first period is A instances of downlink positioning reference signal resource set DL-PRS Resource Set, and the processor 1010 is further configured to report a value of A, where A is a positive integer.

In some embodiments, the measurement time window includes at least one of the following:

positioning reference signals of one or more transmission and reception points TRPs;

a start time of the measurement time window;

a length of the measurement time window;

a period of the measurement time window; or a priority of the measurement time window.

In some embodiments, the processor 1010 is further configured to report a first period associated with a current measurement and/or period indication information in a first period of measurement; or report a correspondence between the current measurement and the measurement time window or a correspondence between the current measurement and a period of the measurement time window.

In some embodiments, the reported time information has a correspondence with a start time of the first period and/or a start time of an actual measurement period in the first period; or the reported time information has a correspondence with a start time of the measurement time window and/or a start time of an actual measurement period correspond-
ing to the measurement time window.

In some embodiments, the processor 1010 is configured to
perform at least one of the following:

X1 or X2, where X1 or X2 is reported in a case that X1
    or X2 is different from a value configured by the second
    device; or X1 or X2, in a case of reporting indicated by the second
    device.

In some embodiments, if within the MR, the MO, or the
preset time window, a moving distance of the first device is
less than a preset first threshold, and/or, a measurement
result difference of the first device is less than a preset
second threshold, reporting of the location information
associated with the PRS set instance is not started; or if within the MR, the MO, or the preset time window, a
      moving distance of the first device is greater than a
      preset third threshold, and/or, a measurement result
      difference of the first device is greater than a preset
      fourth threshold, reporting of the location information
      associated with the PRS set instance is started.

An embodiment of this application further provides a
network-side device, including a processor and a commu-
nication interface, where the communication interface is
configured to receive location information and time infor-
mation that are reported by the first device, where the
reported location information corresponds to first-type loca-
tion information, and the first-type location information
includes at least one of the following: location information
associated with a first period of a positioning reference
signal set instance (PRS set instance); location information
associated with a measurement occasion (MO); location
information associated with a measurement report (MR);
and location information associated with a measurement
time window. The network-side device embodiment corre-
sponds to the foregoing network-side device (that is, the
second device) method embodiment, and all implementation
processes and implementations of the foregoing method
embodiment can be applied to the network-side device
embodiment, with the same technical effects achieved.

Figure 12:
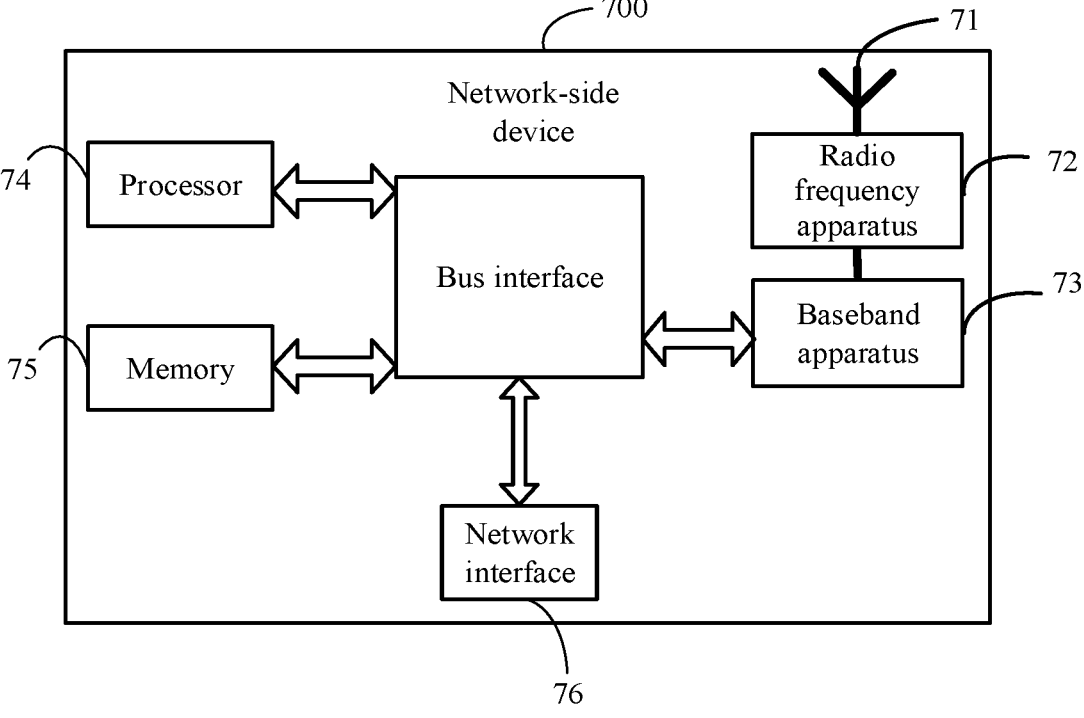
FIG. 12 is a schematic structural diagram of a network-side device according to an embodiment of this application.

Specifically, an embodiment of this application further
provides a network-side device. As shown in FIG. 12, the
network-side device 700 includes an antenna 71, a radio
frequency apparatus 72, and a baseband apparatus 73. The
antenna 71 is connected to the radio frequency apparatus 72.
In an uplink direction, the radio frequency apparatus 72
receives information by using the antenna 71, and sends the
received information to the baseband apparatus 73 for
processing. In a downlink direction, the baseband apparatus
73 processes to-be-sent information, and sends the informa-
tion to the radio frequency apparatus 72; and the radio
frequency apparatus 72 processes the received information
and then sends the information out by using the antenna 71.

The frequency band processing apparatus may be located
in the baseband apparatus 73. The method performed by the
network-side device in the foregoing embodiments may be
implemented in the baseband apparatus 73, and the base-
band apparatus 73 includes a processor 74 and a memory 75.

The baseband apparatus 73 may include, for example, at
least one baseband board, where a plurality of chips are
disposed on the baseband board. As shown in FIG. 12, one
of the chips, for example, the processor 74, is connected to
the memory 75, to invoke a program in the memory 75 to
perform the operation of the network device shown in the
foregoing method embodiments.

The baseband apparatus 73 may further include a network
interface 76, configured to exchange information with the radio frequency apparatus 72, where the interface is, for
example, a common public radio interface (CPRI).

Specifically, the network-side device in this embodiment
of this application further includes: instructions or a program
stored in the memory 75 and capable of running on the
processor 74. The processor 74 invokes the instructions or
program in the memory 75 to execute the method executed
by the modules shown in FIG. 9, with the same technical
effects achieved. To avoid repetition, details are not repeated
herein.

An embodiment of this application further provides a
readable storage medium. The readable storage medium
may be non-volatile or volatile. A program or instructions
are stored in the readable storage medium. When the pro-
gram or the instructions are executed by a processor, the
processes of the foregoing embodiments of the positioning
method shown can be implemented, with the same technical
effects achieved. To avoid repetition, details are not
described herein again.

An embodiment of this application further provides a
computer program product, where the computer program
product is stored in a non-transitory storage medium, and
when being executed by at least one processor, the computer
program product is configured to implement the steps of the
foregoing positioning method, with the same technical
effects achieved. To avoid repetition, details are not repeated
herein.

The processor is a processor in the terminal described in
the foregoing embodiments. The readable storage medium
includes a computer-readable storage medium, for example,
a computer read-only memory (ROM), a random access
memory (RAM), a magnetic disk, or an optical disc.

An embodiment of this application further provides a
chip, where the chip includes a processor and a communi-
cation interface, the communication interface is coupled to
the processor, and the processor is configured to run a
program or instructions to implement the foregoing posi-
tioning method embodiments, with the same technical
effects achieved. To avoid repetition, details are not repeated
herein.

It should be understood that the chip mentioned in the
embodiments of this application may also be referred to as
a system-level chip, a system chip, a chip system, a system-
on-chip, or the like.

It should be noted that the terms "include", "comprise", or
any of their variants are intended to cover a non-exclusive
inclusion, such that a process, a method, an article, or an
apparatus that includes a list of elements not only includes
those elements but also includes other elements that are not
expressly listed, or further includes elements inherent to
such process, method, article, or apparatus. In absence of
more constraints, an element preceded by "includes a . . . "
does not preclude existence of other identical elements in the
process, method, article, or apparatus that includes the
element. In addition, it should be noted that the scope of the
method and the apparatus in the embodiments of this appli-
cation is not limited to executing the functions in an order
shown or discussed, but may also include executing the
functions in a substantially simultaneous manner or in a
reverse order, depending on the functions involved. For
example, the described methods may be performed in an
order different from that described, and steps may alterna-
tively be added, omitted, or combined. In addition, features
described with reference to some examples may be com-
bined in other examples.

According to the description of the foregoing implemen-
tations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially or the part contributing to the prior art may be implemented in a form of a computer software product. The computer software product is stored in a storage medium (such as a ROM/ RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A positioning method, wherein the method comprises:
performing, by a first device, measurement on a positioning reference signal (PRS); and
reporting, by the first device, location information and time information to a second device, wherein the reported location information corresponds to first-type location information, and the first-type location information comprises:
location information associated with a measurement time window;
before the performing measurement on a positioning reference signal (PRS), the method further comprises:
receiving, by the first device, a location information request from a third device, wherein the location information request comprises:
number of measurement time windows corresponding to location information;
wherein the number of measurement time windows is greater than 1; and
measurement time window information;
the measurement time window information comprises:
positioning reference signals of one or more transmission and reception points transmission and reception points (TRPs);
a start time of the measurement time window;
a length of the measurement time window; and
a period of the measurement time window.

2. The positioning method according to claim 1, wherein
N1 pieces of location information are reported for one MO; or
at least one piece of location information is reported for a period T of M1 PRS set instances or a first period; or
N2 pieces of location information are reported for one MR period; or
at least one piece of location information is reported for M2 MOs; or
K1 pieces of location information are reported for one measurement time window; or
at least one piece of location information is reported for K2 measurement time windows; wherein
N1, M1, N2, M2, K1, and K2 are positive integers.

3. The positioning method according to claim 2, wherein the first period is greater than or equal to N times the period T of the positioning reference signal, wherein N is a positive integer and N depends on at least one of the following information:
carrier specific scaling factor (CSSF);
number of receive beams;
period of measurement gap;
period of positioning reference signal;
processing capability of the first device;
PRS processing capability of the first device;
muting configuration of PRS; or
first indication information, wherein the first indication information indicates that N is 1 or a default value or an integer greater than 1.

4. The positioning method according to claim 1, wherein the reported location information comprises first information, and the first information comprises at least one first information element, and the first information element comprises at least one of the following:
reference signal received power (RSRP) measurement information;
reference signal time difference (RSTD) measurement information;
receive-transmit time difference Rx-Tx time difference measurement information;
time of arrival (TOA) measurement information;
time difference of arrival (TDOA) information;
downlink angle of departure (AoD) measurement information;
multi round-trip time (Multi-RTT) information;
observed time difference of arrival (OTDOA) measurement information;
assisted-global navigation satellite system (A-gnss) information;
sensor information;
enhanced cell identifier (ECID) positioning information;
absolute location information;
relative location information;
reference location information;
positioning reference signal identification information;
time identification information;
angle measurement information;
transmission and reception point identifier (TRP ID) information;
time information;
additional measurement information; or
additional path list.

5. The positioning method according to claim 4, wherein the first information further comprises at least one of the following:
second-type information, indicating a relationship between the first information element and PRS set instance, MO, MR, or measurement time window;
second indication information, indicating a relationship between the first information element and the number of PRS set instances, MOs, MRs, or measurement time windows; or
first time information.

6. The positioning method according to claim 4, wherein in a case of being a first information element obtained for more than one PRS set instance, the first information element comprises any one of the following:
first-item information: the first information element being first information element information obtained by filtering measurement information for more than one PRS set instance or measurement time window; and second-item information: the first information element being first information element information in one-to-one correspondence to measurement information for PRS set instances or measurement time windows.

7. The positioning method according to claim 4, wherein the first information comprises one, X1, or X2 first information elements, X1 and X2 being positive integers greater than 1, and the first information comprises at least one of the following:

X1 first information elements obtained through measurement for X1 PRS set instances or measurement time windows;

X1 first information elements obtained through measurement for X1 PRS set instances or measurement time windows closest to a reporting time;

X1 first information elements obtained through measurement for X1 PRS set instances or measurement time windows before a preset reference time;

X1 first information elements obtained through measurement for X1 PRS set instances or measurement time windows within a preset time window;

X2 first information elements obtained through measurement for X2 MOs;

X2 first information elements obtained through measurement for X2 MOs closest to the reporting time;

X2 first information elements obtained through measurement for X2 MOs before the preset reference time; or X2 first information elements obtained through measurement for X2 MOs within the preset time window.

8. The positioning method according to claim 4, wherein the first information is first location information, and the first information element is a first location information element; or the first information is first positioning location information, and the first information element is first signal measurement information; or the first information is first signal measurement information, and the first information element is a first signal measurement list; or the first information is a first signal measurement list, and the first information element is a first signal measurement unit; or the first information is a first signal measurement unit, and the first information element is a first signal measurement value.

9. The positioning method according to claim 8, wherein the first signal measurement information comprises one, X1, or X2 first signal measurement lists, X1 and X2 being positive integers, each of the first signal measurement lists comprises B first signal measurement units, B being an integer less than or equal to nrMaxTRP, and nrMaxTRP is an integer greater than 1.

10. The positioning method according to claim 8, wherein the first signal measurement information comprises one first signal measurement list and/or at least one of the following:

Y1-1 second signal measurement lists obtained through measurement for Y1-1 PRS set instances or measurement time windows;

Y1-1 second signal measurement lists obtained through measurement for Y1-1 PRS set instances or measurement time windows closest to a reporting time;

Y1-1 second signal measurement lists obtained through measurement for Y1-1 PRS set instances or measurement time windows before a preset reference time;

Y1-1 second signal measurement lists obtained through measurement for Y1-1 PRS set instances or measurement time windows within a preset time window;

Y2-1 second signal measurement lists obtained through measurement for Y2-1 MOs;

Y2-1 second signal measurement lists obtained through measurement for Y2-1 MOs closest to the reporting time;

Y2-1 second signal measurement lists obtained through measurement for Y2-1 MOs before the preset reference time; or Y2-1 second signal measurement lists obtained through measurement for Y2-1 MOs within the preset time window; wherein Y1 and Y2 are positive integers greater than 1.

11. The positioning method according to claim 8, wherein the first signal measurement list comprises one first signal measurement unit and/or at least one of the following:

second signal measurement unit list;

Y1-1 second signal measurement units obtained through measurement for Y1-1 PRS set instances or measurement time windows;

Y1-1 second signal measurement units obtained through measurement for Y1-1 PRS set instances or measurement time windows closest to a reporting time;

Y1-1 second signal measurement units obtained through measurement for Y1-1 PRS set instances or measurement time windows before a preset reference time;

Y1-1 second signal measurement units obtained through measurement for Y1-1 PRS set instances or measurement time windows within a preset time window;

Y2-1 second signal measurement units obtained through measurement for Y2-1 MOs;

Y2-1 second signal measurement units obtained through measurement for Y2-1 MOs closest to the reporting time;

Y2-1 second signal measurement units obtained through measurement for Y2-1 MOs before the preset reference time; or Y2-1 second signal measurement units obtained through measurement for Y2-1 MOs within the preset time window; wherein Y1 and Y2 are positive integers greater than 1.

12. The positioning method according to claim 7, wherein the location information request further comprises at least one of the following indication information:

a location information request for more than one PRS set instance or measurement time window;

a location information request corresponding to a PRS set instance;

the number of PRS set instances, or MOs corresponding to location information;

value of X1 or X2;

priority information; or reference time information.

13. The positioning method according to claim 2, wherein the first period is different from the period T, and the method further comprises:

reporting, by the first device, the first period and/or a cause for extending the period T.

14. The positioning method according to claim 1, wherein the first period is A instances of downlink positioning reference signal resource set (DL-PRS Resource Set), and the method further comprises: reporting, by the first device, a value of A, wherein A is a positive integer.

15. The positioning method according to claim 1, wherein the measurement time window further comprises:

a priority of the measurement time window.

16. The positioning method according to claim 1, wherein the method further comprises:

the location information reported by the first device is associated with the first period and/or indication information of the first period; or the first device reports a correspondence between the location information and the measurement time window or a correspondence between the location information and a period of the measurement time window.

17. The positioning method according to claim 1, wherein the reported time information has a correspondence with a start time of the first period and/or a start time of an actual measurement period in the first period; or the reported time information has a correspondence with a start time of the measurement time window and/or a start time of an actual measurement period corresponding to the measurement time window.

18. The positioning method according to claim 1, wherein if within the MR, the MO, or the preset time window, a moving distance of the first device is less than a preset first threshold, and/or a measurement result difference of the first device is less than a preset second threshold, reporting of the location information associated with the PRS set instance is not started; or if within the MR, the MO, or the preset time window, a moving distance of the first device is greater than a preset third threshold, and/or, a measurement result difference of the first device is greater than a preset fourth threshold, reporting of the location information associated with the PRS set instance is started.

19. A first device, comprising a processor, a memory, and a program or instructions stored in the memory and capable of running on the processor, wherein when the program or the instructions are executed by the processor, the following steps are implemented:

performing measurement on a positioning reference signal (PRS); and reporting location information and time information to a second device, wherein the reported location information corresponds to first-type location information, and the first-type location information comprises:

location information associated with a measurement time window;

when the program or the instructions are executed by the processor, the following steps are further implemented:

before the performing measurement on a positioning reference signal (PRS), receiving a location information request from a third device, wherein the location information request comprises:

the number of measurement time windows corresponding to location information; wherein number of measurement time windows is greater than 1; and measurement time window information;

the measurement time window information comprises:

positioning reference signals of one or more transmission and reception points transmission and reception points (TRPs);

a start time of the measurement time window;

a length of the measurement time window; and a period of the measurement time window.

20. A non-transitory readable storage medium, wherein the non-transitory readable storage medium stores a program or instructions, and when the program or the instructions are executed by a processor of a first device, the following steps are implemented:

performing measurement on a positioning reference signal (PRS); and reporting location information and time information to a second device, wherein the reported location information corresponds to first-type location information, and the first-type location information comprises:

location information associated with a measurement time window;

when the program or the instructions are executed by the processor of the first device, the following steps are further implemented:

before the performing measurement on a positioning reference signal (PRS), receiving a location information request from a third device, wherein the location information request comprises:

number of measurement time windows corresponding to location information; wherein the number of measurement time windows is greater than 1; and measurement time window information;

the measurement time window information comprises:

positioning reference signals of one or more transmission and reception points transmission and reception points (TRPs);

a start time of the measurement time window;

a length of the measurement time window; and a period of the measurement time window.

* * * * *